(12) United States Patent
Deo et al.

(10) Patent No.: US 6,496,928 B1
(45) Date of Patent: Dec. 17, 2002

(54) SYSTEM FOR TRANSMITTING SUBSCRIPTION INFORMATION AND CONTENT TO A MOBILE DEVICE

(75) Inventors: Vinay Deo, Bellevue, WA (US); David Tuniman, Redmond, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/108,145

(22) Filed: Jun. 30, 1998

Related U.S. Application Data

(60) Provisional application No. 60/070,720, filed on Jan. 7, 1998, provisional application No. 60/075,123, filed on Feb. 13, 1998, and provisional application No. 60/074,236, filed on Feb. 10, 1998.

(51) Int. Cl.[7] .............................. H04L 9/00; H04K 1/00
(52) U.S. Cl. ........................ 713/153; 380/270; 380/277
(58) Field of Search ................................. 713/151, 154, 713/153, 163, 162; 380/270, 271, 277, 281

(56) References Cited

U.S. PATENT DOCUMENTS

| 4,613,901 A | | 9/1986 | Gilhousen et al. ........... 358/122 |
| 5,325,432 A | | 6/1994 | Gardeck et al. ............... 380/21 |
| 6,084,969 A | * | 7/2000 | Wright et al. ................ 380/271 |

FOREIGN PATENT DOCUMENTS

| WO | WO 95/12931 | 11/1995 |
| WO | WO 97/28649 | 7/1997 |

* cited by examiner

*Primary Examiner*—Matthew Smithers
(74) *Attorney, Agent, or Firm*—Joseph R. Kelly; Westman, Champlin & Kelly, P.A.

(57) ABSTRACT

A system controls access to broadcast messages received by a plurality of mobile devices. Selected mobile devices are provided with a broadcast encryption key (BEK). The broadcast messages are encrypted using the BEK prior to broadcasting so that the selected mobile devices containing the BEK can decrypt the broadcast messages. The broadcast messages are then broadcast.

36 Claims, 17 Drawing Sheets

SYSTEM FOR TRANSMITTING SUBSCRIPTION INFORMATION AND CONTENT TO A MOBILE DEVICE

REFERENCE TO CO-PENDING APPLICATION

The present application claims priority from U.S. provisional application serial number 60/070,720 filed on Jan. 7, 1998 entitled FEATURES OF TRANSMISSION AND MANIPULATION OF DATA and serial number 60/075,123 filed Feb. 13, 1998 entitled FEATURES OF A COMMUNICATION CHANNEL and serial number 60/074,236 filed Feb. 10, 1998 entitled FEATURES OF DEVICE DRIVER.

The present invention hereby fully incorporates by reference U.S. application entitled A SYSTEM FOR BROADCASTING TO, AND PROGRAMMING, A MOBILE DEVICE IN A PROTOCOL, DEVICE, AND NETWORK INDEPENDENT FASHION, Ser. No. 09/108,953 filed on even date herewith, now U.S. Pat. No. 6,282,294.

BACKGROUND OF THE INVENTION

The present invention relates to personal mobile computing devices commonly known as mobile devices. More particularly, the present invention relates to a system and method for delivering information to, and programming mobile devices.

Mobile devices are small electronic computing devices often referred to as personal digital assistants. Many such mobile devices are pagers, hand held devices, or palm size devices, which comfortably fit within the hand. One commercially available device is sold under the tradename HandHeld PC (or H/PC) having software provided by Microsoft Corporation of Redmond, Washington.

Generally, the mobile device includes a processor, random access memory (RAM), and an input device such as a keyboard and a display. The keyboard can be integrated with the display, such as when the keyboard is incorporated as a touch sensitive display. A communication interface is optionally provided and is commonly used to communicate with the desktop computer. A replaceable or rechargeable battery powers the mobile device. Optionally, the mobile device can receive power from an external power source that overrides or recharges the built-in battery.

In some prior applications, the mobile device is used in conjunction with the desktop computer. For example, the user of the mobile device may also have access to, and use, a desktop computer at work or at home or both. If the mobile device is an H/PC brand device or other similar device, the user typically runs the same types of applications on both the desktop computer and on the mobile device. Thus, it is quite advantageous for such mobile devices to be designed to be coupled to the desktop computer to exchange information with, and share information with, the desktop computer.

Another technique for providing information to mobile devices is through a wireless transmission link. Such information can include electronic mail or news, weather, sports, traffic and local event information. The information is typically obtained from a desktop computer connected to the Internet and delivered over a wired connection. However, it may be desirable to deliver such information over a wireless connection as well. A wireless receiver on the mobile device can act to receive information as it is being sent to the mobile device.

Where the mobile device is a pager, each pager in a given system has one or more addresses. When a message is transmitted over a wireless channel, it is destined for an address. All pagers assigned to that wireless channel receive the message and check the address contained in the message against its own addresses. This address-matching algorithm can be implemented either in the hardware, or in software, or in a combination of hardware and software. If the address associated with the incoming message does not match any of the addresses on the pager, then the message is discarded. However, if the address does match one of the addresses on the pager, then the message is accepted and forwarded to higher level software in the protocol stack on the pager for suitable processing.

Addresses can typically be of two types. The first is a personal address which is unique within a given wireless network (i.e., only one pager has that address). The personal address is used for sending a message to a particular pager.

The second type of address is a broadcast address. A broadcast address is typically programmed into many pagers within a given wireless network. Thus, a single message delivered over a broadcast address is received and accepted by multiple pagers in the network. Such addresses are used for implementing broadcast services, such as the news, traffic, weather, etc. services mentioned above.

There is currently no convenient way to reprogram the addresses in mobile devices, such as pagers. Instead, the pagers must be brought back to a service center where special tools are used to access and modify the internal storage of the pager, where the addresses are stored. Some prior systems have attempted to accomplish over-the-air programming. In such systems, the network owner (or carrier) sends a special message to the pager that changes the addresses in the pager.

However, to date, this has been quite uncommon. Over-the-air programming presents significant difficulties with respect to security. In other words, if the provider of the broadcast services being programmed wishes to charge users a fee or subscription price to receive the broadcast services, then the programming messages must be highly secure. Otherwise, unauthorized programming of the pager devices to receive the broadcast services would be problematic.

Encryption techniques have not been used in any effective way in the paging environment. There are a number of reasons for this. First, processors in conventional pagers are typically not provided with any means to implement decryption algorithms in such a way as to decrypt encrypted messages arriving at the pager. In addition, there is currently no method of allowing a secure element (such as a device driver) to rely on an external software security element (such as a security component dynamically linked library (DLL)) to perform decryption. In order to decrypt the content of an encrypted message, the security component must obtain from the device driver the appropriate decryption key. Thus, the device driver (which may be assumed to be a trusted device) must pass the encryption key to an external element (the security component DLL), which compromises the security of the encryption key, and thus the security of the subscription system.

Further, with the advent of global computer networks, such as the Internet, information broadcast services have become prevalent and important. However, a typical pager can only have a limited number of addresses (usually 2–8). A much larger number of broadcast services would desirably be offered to suit a wide range of interests and needs for the various users of the pagers. That being the case, each individual user would need to have the pager reprogrammed (by taking it back to a service center) so that it contained the addresses which would select desired broadcast services, desired by the individual user. This would need to be done each time the user wished to add, delete, or change the broadcast services selection. This is highly cost inefficient and is believed to have at least stunted the growth and proliferation of such broadcast services.

For these reasons, many paging carriers provide free broadcast services. These items are free because there is no current cost effective way to manage subscriptions to these services. The content of these services is provided by an independent content provider but is transmitted by wireless network operators. If a user wishes to add a new service, or drop a service, the device must be returned to the wireless network operator service center for reprogramming of addresses contained in the pager. This means that the independent content provider cannot manage subscriptions independent of the carriers (or wireless network operators). Even if this were to be accomplished, as discussed above, there is currently no efficient mechanism by which content messages could be transmitted in a secure fashion.

SUMMARY OF THE INVENTION

A system controls access to broadcast messages received by a plurality of mobile devices. Selected mobile devices are provided with a broadcast encryption key (BEK). The broadcast messages are encrypted using the BEK prior to broadcasting so that the selected mobile devices containing the BEK can decrypt the broadcast messages. The broadcast messages are then broadcast.

DETAILED DESCRIPTION OF THE PREFERRED EMBODIMENTS

Figure 1:
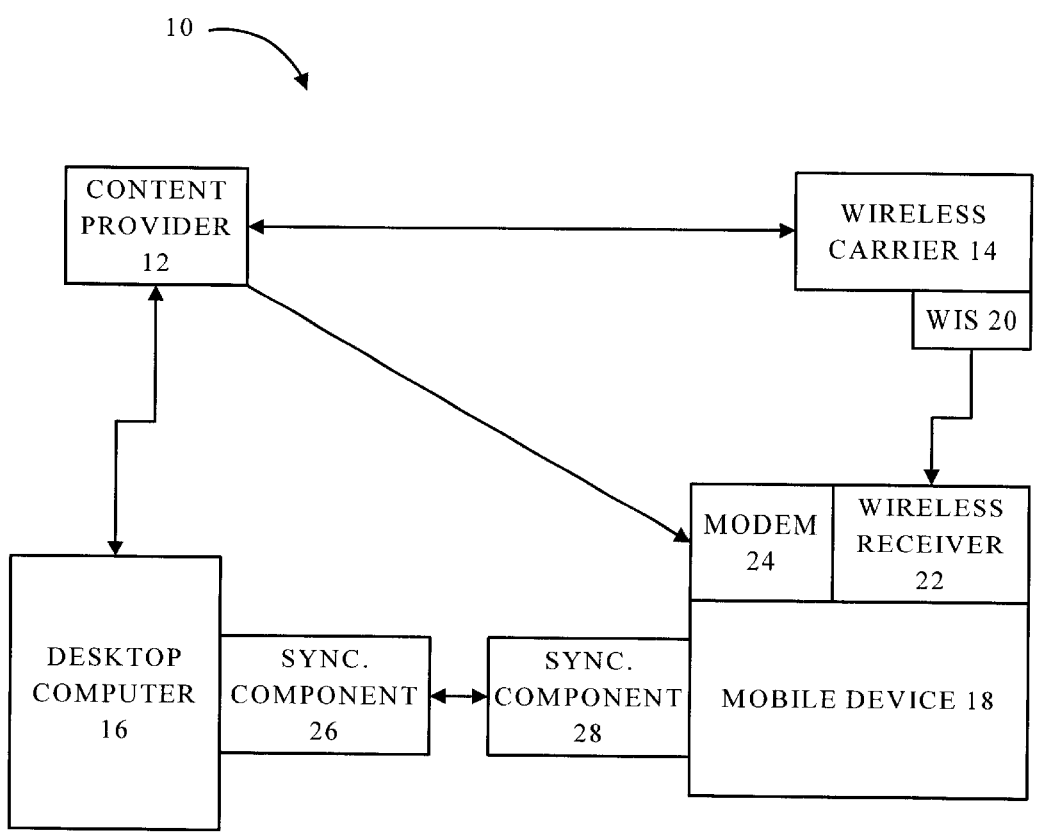
FIG. 1 is a simplified block diagram illustrating one embodiment of a mobile device in a system in accordance with the present invention.

FIG. 1 illustrates a system 10 in which the present invention is illustratively implemented. System 10 includes content provider 12, wireless carrier 14, desktop computer 16 and mobile device 18. Content provider 12 provides any suitable type of data from a database or other data source. For example, content provider 12 is discussed hereinafter as a provider of wireless services or other types of services which may be desired by a user of mobile device 18. Examples of such services include news, weather and sports services, stock quote services, traffic report services, etc.

Wireless carrier 14 is described in greater detail later in the application. Briefly, however, wireless carrier 14 is configured to receive service content and programming messages (hereinafter content) from content provider 12 via dial-up or direct internet connection, or a network connection. The way in which wireless carrier 14 obtains information from content provider 12 can include proprietary or non-proprietary means. For example, in one illustrative embodiment, wireless carrier 14 subscribes to active channels at a content provider's web site using the Internet Explorer product available from Microsoft Corporation. The Internet Explorer component pulls data from the web site and stores it in a cache for later transmission to mobile device 18.

Wireless carrier 14 also includes a wireless information server (WIS) 20. Server 20 splits the content received from content provider 12 into pieces which are compatible with the particular type of transport being used by wireless carrier 14. For instance, server 20 may split the data such that it conforms to maximum packet size constraints, character set requirements, etc. for the channel type or transport type being used. Prior to transmission, the data is preferably translated to a different form. As is described in greater detail later in the application, such translation may include various forms of encryption, and may also include compression, encoding, etc. Once the data has been split appropriately such that it conforms to the transport constraints, the data is then configured for transmission over the air through a wireless network (such as through a paging channel) to be received directly on mobile device 18. The transmitted data is received by a wireless receiver and driver component 22 on mobile device 18 where the data is prepared for use by mobile device 18.

Mobile device 18 also preferably includes a modem 24. Thus, rather than being transmitted through wireless carrier 14, the service content can be transmitted directly from content provider 12 through a direct dial-up modem connection to mobile device 18.

Desktop computer 16 will also be described in greater detail later in the specification. Briefly, however, desktop computer 16 is preferably provided with a standard web browser, such as Internet Explorer 4.0, commercially available from the Microsoft Corporation of Redmond, Washington. That being the case, the users of desktop computer 16 can preferably subscribe to channels in a standard fashion which provide the user with certain channel content which can be browsed off-line or on-line. Desktop computer 16 can thus periodically retrieve or receive new content for further transmission to mobile device 18.

Desktop computer 16 also preferably includes synchronization component 26. Briefly, synchronization component 26 is configured to interact with an optional, similar synchronization component 28 on mobile device 18 such that files which are the subject of synchronization can be synchronized from desktop computer 16 to mobile device 18, or vice versa. Once synchronized, both files (those on computer 16 and mobile device 18) contain up to date information.

More specifically, mobile device 18, in the preferred embodiment, can be synchronized with either desktop computer 16, or another mobile device 18, or both. In that instance, properties of objects stored in an object store on mobile device 18 are similar to properties of other instances of the same object stored in an object store on desktop computer 16 or another mobile device 18. Thus, for example, when a user changes one instance of an object stored in an object store on desktop computer 16, the second instance of that object in the object store of mobile device 18 is updated the next time mobile device 18 is connected to desktop computer 16 so that both instances of the same object contain up-to-date data. This is referred to as synchronization.

In order to accomplish synchronization, synchronization components 26 and 28 run on both mobile device 18 and desktop computer 16 (or another mobile device 18). The synchronization components communicate with one another through well defined interfaces to manage communication and synchronization.

It is worth noting that, in the preferred embodiment, while mobile device 18 can be coupled to desktop computer 16, it can be also coupled to another mobile device 18. This connection can be made using any suitable, and commercially available, communication link and using a suitable communications protocol. For instance, in one preferred embodiment, mobile device 18 communicates with either desktop computer 16 or another mobile device 18 with a physical cable which communicates using a serial communications protocol. Other communication mechanisms are also contemplated by the present invention, such as infra-red (IR) communication or other suitable communication mechanisms.

Figure 2:
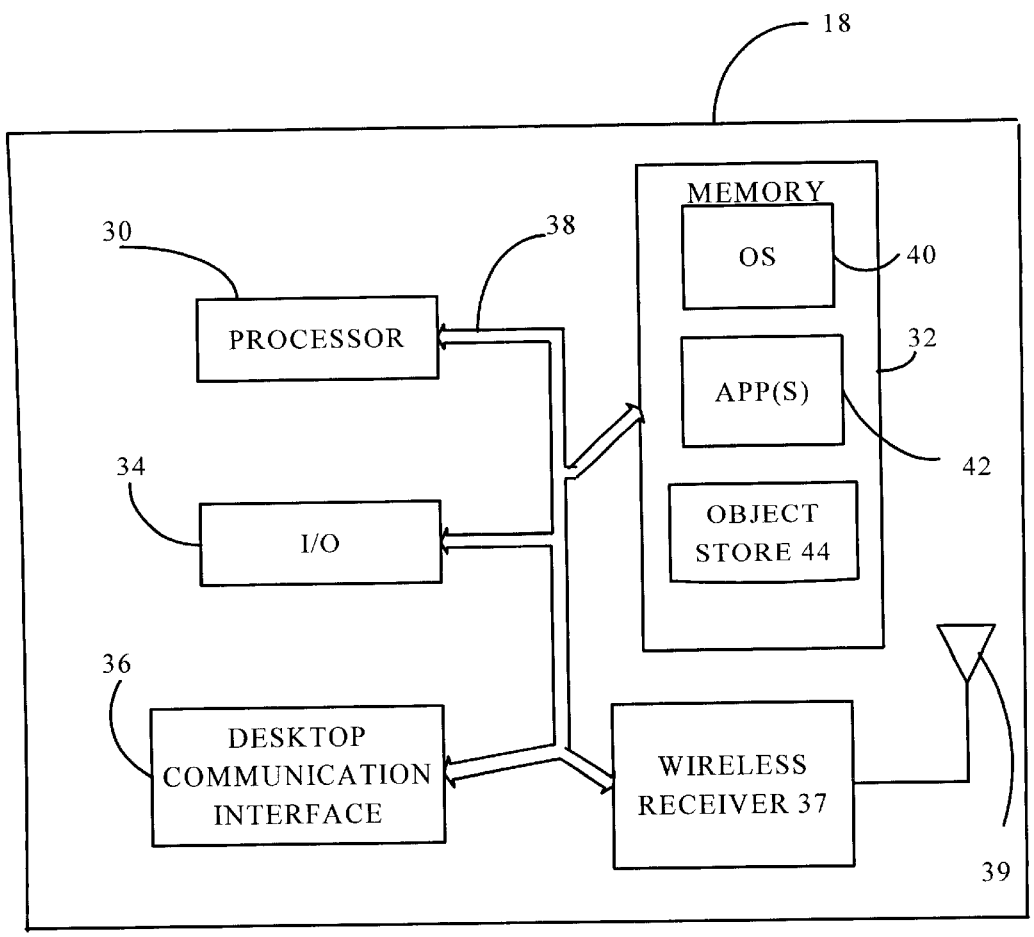
FIG. 2 is a more detailed block diagram of one embodiment of a mobile device shown in FIG. 1.

FIG. 2 is a more detailed block diagram of mobile device 18. Mobile device 18 preferably includes microprocessor 30, memory 32, input/output (I/O) components 34, desktop communication interface 36 wireless receiver 37 and antenna 39. In a preferred embodiment, these components of mobile 10 are coupled for communication with one another over a suitable bus 38.

Memory 32 is preferably implemented as non-volatile electronic memory such as random access memory (RAM) with a battery back-up module (not shown) such that information stored in memory 32 is not lost when the general power to mobile device 18 is shut down. A portion of memory 32 is preferably allocated as addressable memory for program execution, while another portion of memory 32 is preferably used for storage, such as to simulate storage on a disc drive.

Memory 32 includes operating system 40, an application program 42 (such as a personal information manager or PIM, an electronic mail program, etc.), as well as an object store 44. During operation, operating system 40 is preferably executed by processor 30 from memory 32. Operating system 40, in one preferred embodiment, is a Windows CE brand operating system commercially available from Microsoft Corporation. The operating system 40 is preferably designed for mobile devices, and implements database features which can be utilized by PIM 42 through a set of exposed application programming interfaces and methods. The objects in object store 44 are preferably maintained by PIM 42 and operating system 40, at least partially in response to calls to the exposed application programming interfaces and methods.

I/O components 34, in one preferred embodiment, are provided to facilitate input and output operations from a user of mobile device 18. I/O components 34 are described in greater detail with respect to FIGS. 3 and 4.

Desktop communication interface 36 is optionally provided as any suitable communication interface. Interface 36 is preferably used to communicate with desktop computer 16, content provider 12, wireless carrier 14 and optionally another mobile device 18, as described with respect to FIG. 1. Thus, communication interface 36 preferably includes synchronization components 28 for communicating with desktop computer 16 and modem 24 for communicating with content provider 12. Wireless receiver and driver 22 are used for communicating with wireless carrier 14.

Figure 3:
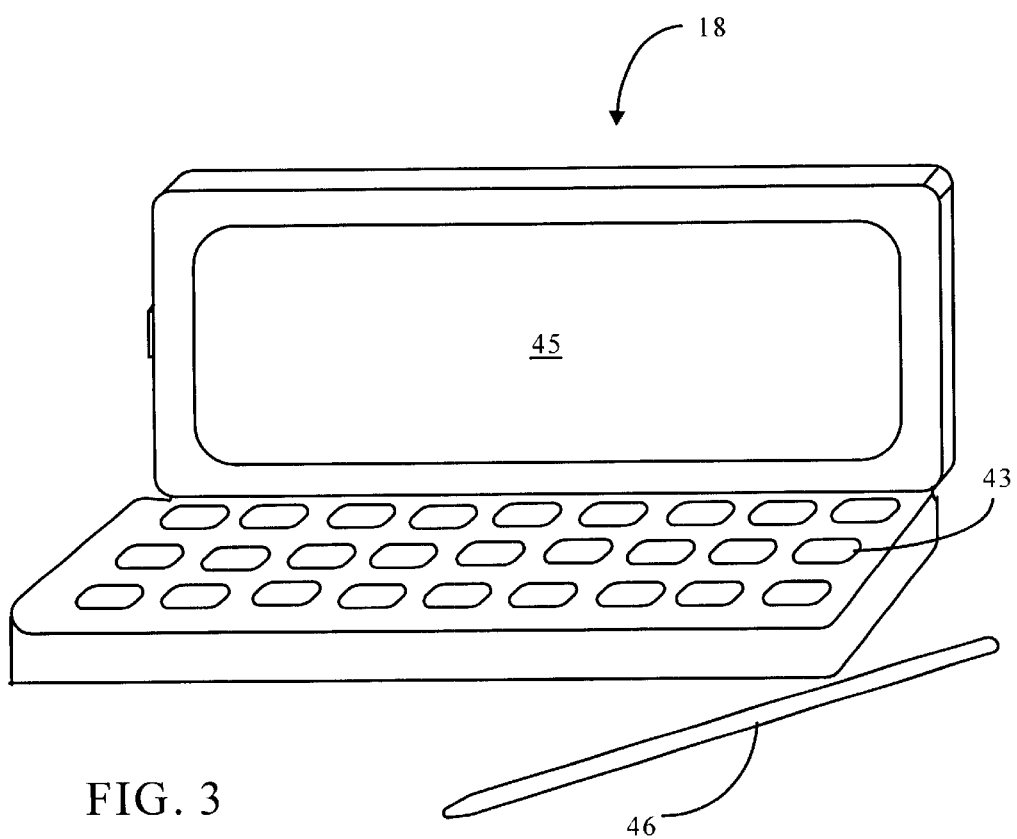
FIG. 3 is a simplified pictorial illustration of one embodiment of the mobile device shown in FIG. 2.

FIG. 3 is a simplified pictorial illustration of one preferred embodiment of a mobile device 18 which can be used in accordance with the present invention. Mobile device 18, as illustrated in FIG. 3, can be a desktop assistant sold under the designation H/PC having software provided by the Microsoft Corporation. In one preferred embodiment, mobile device 18 includes a miniaturized keyboard 43, display 45 and stylus 46. In the embodiment shown in FIG. 3, display 45 is a liquid crystal display (LCD) which uses a contact sensitive display screen in conjunction with stylus 46. Stylus 46 is used to press or contact the display 45 at designated coordinates to accomplish certain user input functions. Miniaturized keyboard 43 is preferably implemented as a miniaturized alpha-numeric keyboard, with any suitable and desired function keys which are also provided for accomplishing certain user input functions.

Figure 4:
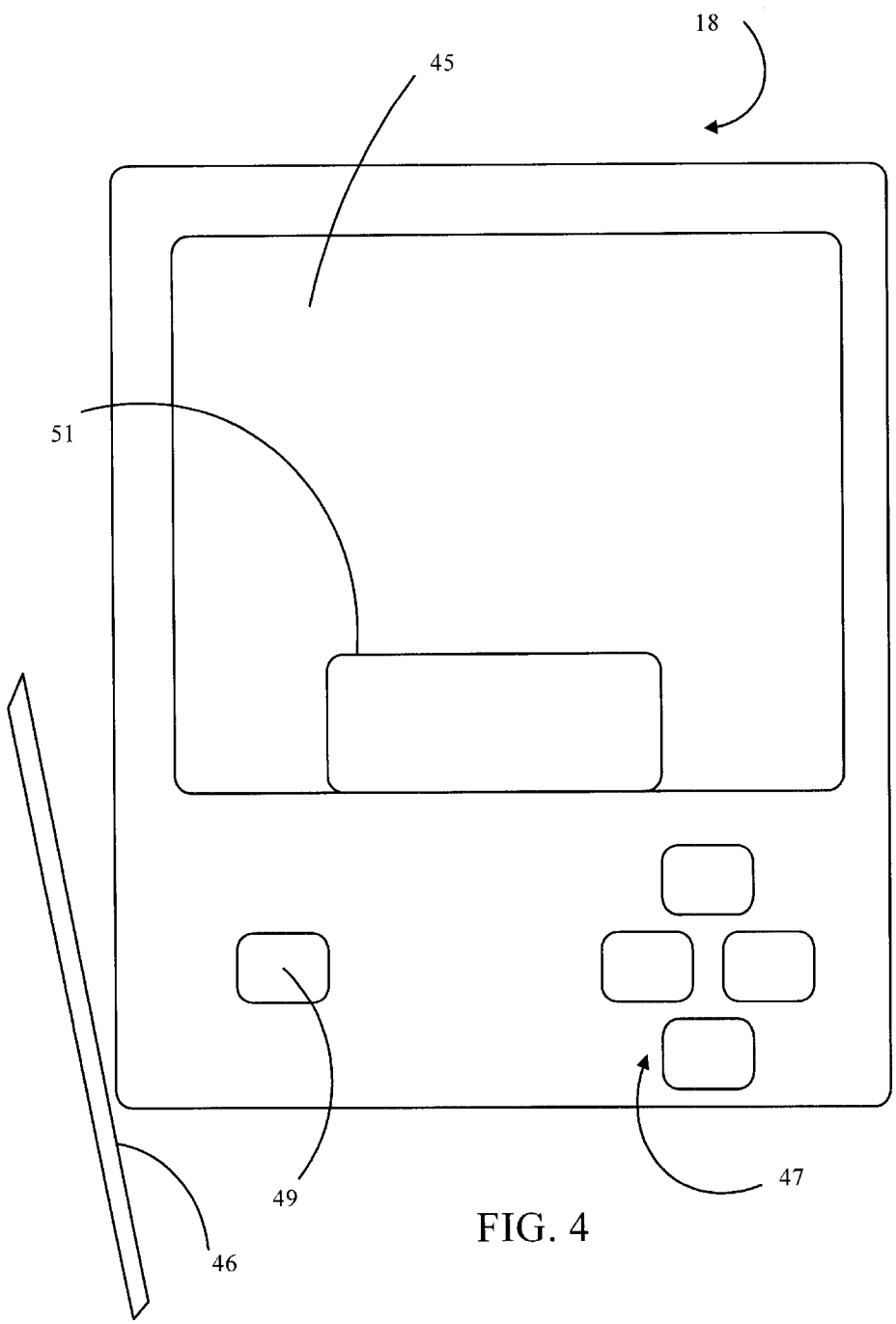
FIG. 4 is a simplified pictorial illustration of another embodiment of the mobile device shown in FIG. 2.

FIG. 4 is another simplified pictorial illustration of the mobile device 18 in accordance with another preferred embodiment of the present invention. Mobile device 18, as illustrated in FIG. 4, includes some items which are similar to those described with respect to FIG. 3, and are similarly numbered. For instance, mobile device 18, as shown in FIG. 4, also includes touch sensitive screen 45 which can be used, in conjunction with stylus 46, to accomplish certain user input functions when mobile device 18 is implemented as a pager, screen 45 is not touch sensitive and stylus 46 is not needed.

It should be noted that the display 45 for the mobile device as shown in FIGS. 3 and 4 can be the same size as one another, or different sizes from one another, but would typically be much smaller than a conventional display used with a desktop computer. For example, displays 45 shown in FIGS. 3 and 4 may be defined by a matrix of only 240×320 coordinates, or 160×160 coordinates, or any other suitable size.

The mobile device 18 shown in FIG. 4 also includes a number of user input keys or buttons (such as scroll buttons 47) which allow the user to scroll through menu options or other display options which are displayed on display 45, or which allow the user to change applications or select user input functions, without contacting display 45. In addition, the mobile device 18 shown in FIG. 4 also preferably includes a power button 49 which can be used to turn on and off the general power to the mobile device 18.

It should also be noted that, in the embodiment illustrated in FIG. 4, mobile device 18 includes a hand writing area 51. Hand writing area 51 can be used in conjunction with stylus 46 such that the user can write messages which are stored in memory 42 for later use by the mobile device 18. In one illustrative embodiment, the hand written messages are simply stored in hand written form and can be recalled by the user and displayed on the display screen 45 such that the user can review the hand written messages entered into the mobile device 18. In another preferred embodiment, mobile device 18 is provided with a character recognition module such that the user can enter alpha-numeric information into mobile device 18 by writing that alpha-numeric information on area 51 with stylus 46. In that instance, character recognition module in the mobile device 18 recognizes the alpha-numeric characters and converts the characters into computer recognizable alpha-numeric characters which can be used by the application programs 42 in mobile device 18.

Of course, where mobile device 18 is implemented as a pager, stylus 46 and handwriting area 51 are not needed. Instead, mobile device 18 is simply provided with screen 45, user input buttons 47 and power button 49.

Figure 5:
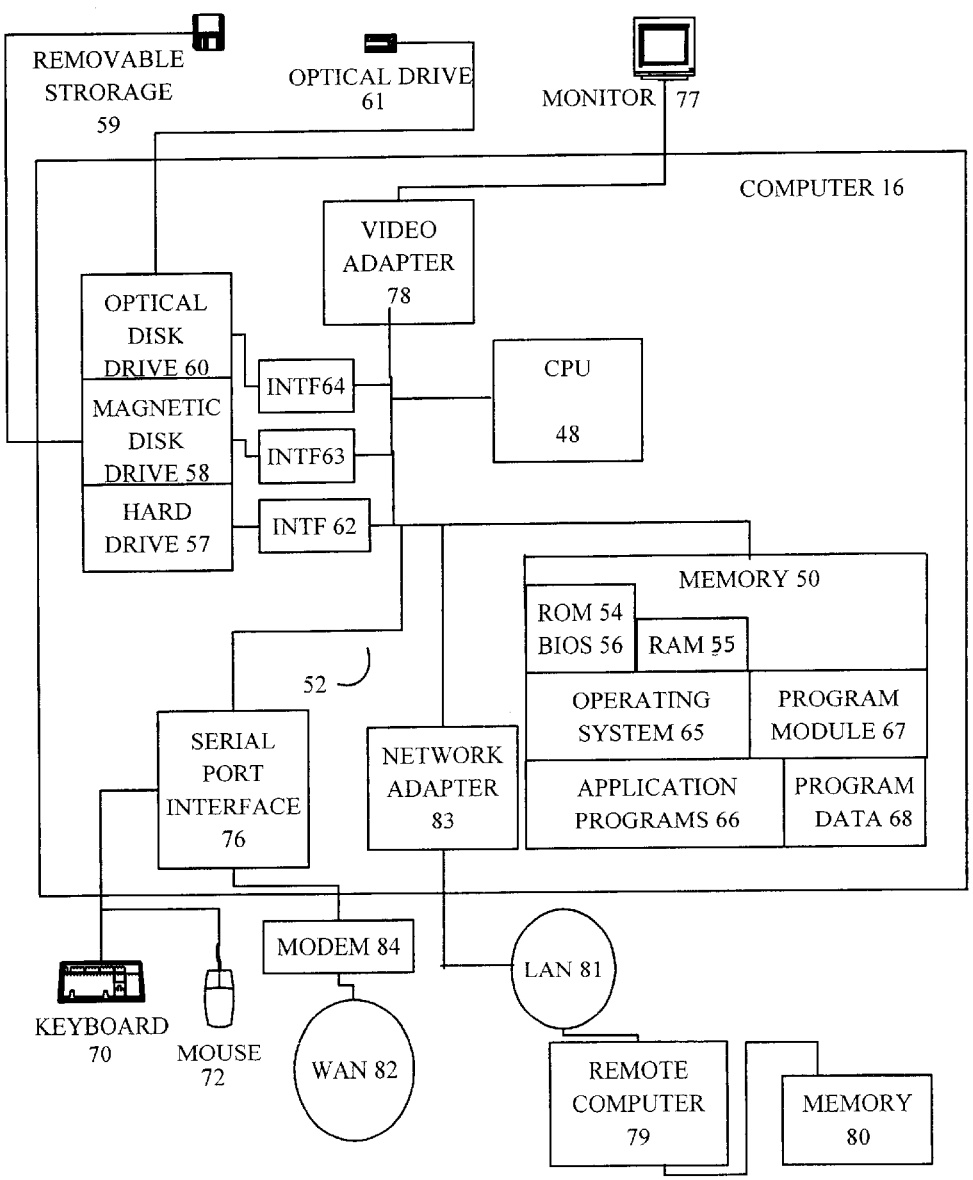
FIG. 5 is a block diagram of one embodiment of a desktop computer in accordance with one aspect of the present invention.

FIG. 5 and the related discussion are intended to provide a brief, general description of a suitable desktop computer 16 in which portions of the invention may be implemented. Although not required, the invention will be described, at least in part, in the general context of computer-executable instructions, such as program modules, being executed by a personal computer 16 or mobile device 18. Generally, program modules include routine programs, objects, components, data structures, etc. that perform particular tasks or implement particular abstract data types. Moreover, those skilled in the art will appreciate that desktop computer 16 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing desktop computer 16 includes a general purpose computing device in the form of a conventional personal computer 16, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54 a random access memory (RAM) 55. A basic input/output system (BIOS) 56, containing the basic routine that helps to transfer information between elements within the desktop computer 16, such as during start-up, is stored in ROM 54. The desktop computer 16 further includes a hard disk drive 57 for reading from and writing to a hard disk (not shown) a magnetic disk drive 58 for reading from or writing to removable magnetic disk 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer-readable media provide nonvolatile storage of computer readable instructions, data structures, program modules and other data for the desktop computer 16.

Although the exemplary environment described herein employs a hard disk, a removable magnetic disk 59 and a removable optical disk 61, it should be appreciated by those skilled in the art that other types of computer readable media which can store data that is accessible by a computer, such as magnetic cassettes, flash memory cards, digital video disks (DVDs), Bernoulli cartridges, random access memories (RAMS), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66 (which may include PIMs), other program modules 67 (which may include synchronization component 26), and program data 68. A user may enter commands and information into the desktop computer 16 through input devices such as a keyboard 70, pointing device 72 and microphone 74. Other input devices (not shown) may include a joystick, game pad, satellite dish, scanner, or the like. These and other input devices are often connected to the processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speaker 75 and printers.

The desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG. 5. The logic connections depicted in FIG. 5 include a local area network (LAN) 81 and a wide area network (WAN) 82. Such networking environments are commonplace in offices, enterprise-wide computer network intranets and the Internet.

When used in a LAN networking environment, the desktop computer 16 is connected to the local area network 81 through a network interface or adapter 83. When used in a WAN networking environment, the desktop computer 16 typically includes a modem 84 or other means for establishing communications over the wide area network 82, such as the Internet. The modem 84, which may be internal or external, is connected to the system bus 52 via the serial port interface 76. In a network environment, program modules depicted relative to desktop computer 16, or portions thereof, including synchronization component 26, may be stored in local or remote memory storage devices. It will be appreciated that the network connections shown are exemplary and other means of establishing a communications link between the computers may be used.

Desktop computer 16 runs operating system 65 that is typically stored in non-volatile memory 54 and executes on the processor 48. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. Application programs are preferably stored in program module 67, in volatile memory or non-volatile memory, or can be loaded into any of the components shown in FIG. 5 from a floppy diskette 59, CDROM drive 61, downloaded from a network via network adapter 83, or loaded using another suitable mechanism.

A dynamically linked library (DLL), comprising a plurality of executable functions is associated with PIMs in the memory for execution by processor 48. Interprocessor and intercomponent calls are facilitated using the component object model (COM) as is common in programs written for Microsoft Windows brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLL associated with the particular PIM or other program is designed specifically to work in conjunction with that PIM and to expose desktop synchronization interfaces that function as described in more detail in the above-referenced co-pending U.S. patent application according to a synchronization protocol. The DLL, in turn, calls interfaces exposed by the PIM in order to access data representing individual properties of objects maintained in an object store. The object store 6, of course, can reside in any one of the suitable memory components described with respect to FIG. 5.

Figure 6:
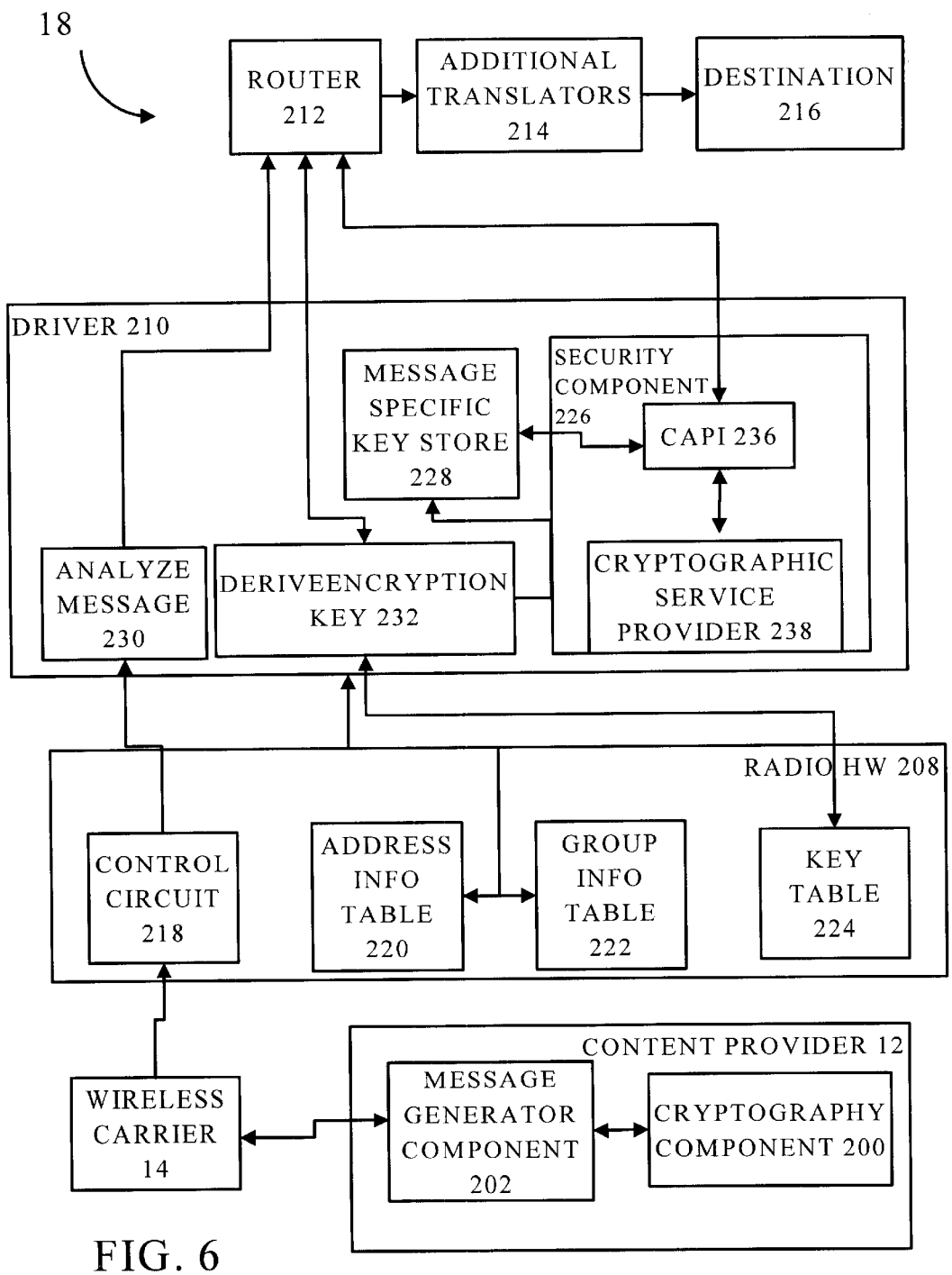
FIG. 6 is a more detailed block diagram of a transmission system including a mobile device in accordance with one aspect of the present invention.

FIG. 6 is a more detailed block diagram of certain components of the system shown in FIG. 1. FIG. 6 illustrates content provider 12, wireless carrier 14 and mobile device 18 in greater detail. Content provider 12 includes cryptography component 200 and message generator component 202. FIG. 6 also illustrates a transmission link which links wireless carrier 14 to mobile device 18. In the embodiment illustrated in FIG. 6, that transmission link is a wireless transmission link, such as a paging channel. However, other transmission links could be used to provide messages from content provider 12 to mobile device 18, such as the synchronization components 26 and 28 and modem 24 discussed above. The present invention proceeds with respect to only the wireless transmission link, for the sake of simplicity.

FIG. 6 also illustrates that mobile device 18 includes radio hardware (radio HW) 208, driver 210, router 212, optional additional translators 214 and destination location 216. Radio HW 208 preferably includes a control circuit 218 and maintains a plurality of data structures. The data structures in radio card 208 in FIG. 6 are illustrated as tables. However, this is an exemplary illustration only. Radio HW 208 is, in actuality, free to store the data in some other manner to optimize storage or speed of access. Also, it is not necessary for radio HW 208 to store these data structures at all. That is simply a preferable implementation when radio HW 208 is implemented as a removable hardware item (e.g., a radio PCMCIA type card). Storing the data structures on the radio HW 208 in non-volatile memory enables a user to remove the card from one mobile device 18 and plug it into another and carry the subscription information easily to that new mobile device 18. It also allows for implementing more of the subscription management function (such as the AnalyzeMessage( ) or other functions described below) in the radio hardware. However, device driver 210 can also store these data structures in system memory and carry out the filtering and subscription management functions in the software, although this is less optimal in some respects.

In any case, FIG. 6 illustrates an embodiment in which radio HW 208 maintains address table 220, group information table 222 and key table 224. These data structures are fully described below.

Address Table
This table is used to store address related information.

| Status (1) | ey ndex 1) | Expiration Date (2) | Address Tag (8) | Address Info n) | ddressName 32)* | escrip-tion 64)* |
|---|---|---|---|---|---|---|
| 0x01 | | 401 | PERSONAL | | | |
| 0x01 | | 0 | EXEC | | | |
| 0x01 | | 534 | NEWS | | | |
| 0x00 | | 0 | (empty) | | | |

Fields marked with '*' can be stored in volatile memory (e.g. in the registry) to save memory size of the non-volatile memory in radio HW. These have not been included in the size calculations.

Status: This is a flag byte. The following are illustrative flags:

| Flag Name | Value | Meaning |
|---|---|---|
| ADDRESS_FLAG_ENABLE | 0x01 | If set, the address is enabled (message received on this address will be processed). If not set, messages received on this address are discarded by the card. |
| ADDRESS_FLAG_PRIORITY | 0x02 | If set, messages of this address should be delivered to the higher levels immediately (e.g. personal address). If not set, the messages can be buffered internally for later delivery. |
| ADDRESS_FLAG_AC_ONLY | 0x04 | This address is enabled only when external power is available. |
| ADDRESS_FLAG_PO_ONLY | 0x08 | This addess is enabled only when the device is powered on. |
| | 0x10–0x80 | Reserved for future use |

The driver preferably detects AC and device ON/OFF status changes to enable/disable addresses based on ADDRESS_FLAG_AC_ONLY and ADDRESS_FLAG_PU_ONLY.

KeyIndex: If non-0, index into the key table for the associated key. This key is used when a message arrives on this address that does not use any service group code.

ExpirationDate If non-0, it indicates the date on which this address would be disabled. It is stored as, for example, number of days from Jan 1, 1997. Midnight is assumed (thus the expiration date is the last day of the service). Note that card or the driver may not be expected to act on this value—higher level applications will access and act on this value.

AddressTag: Tag for the address. The address tag is used only internally for programming and accessing the addresses.

AddressInfo: This is the address and associated information for the use of the underlying network (e.g. in FLEX system, this would be the capcode and associated properties such as Collapse value, Phase, etc. In cellular systems, this would be the EIN (equipment identification number)).

AddressName: Descriptive name for the address (e.g. MSNBC, NewsNow, etc.).

Description: Descriptive text for the address (e.g."Your stock and company news channel", Overall Size=(1+1+2+8+32)*16=704 Bytes (For a Flex radio)

Key Table

This table is used to store security related information. This is illustratively a pooled resource as one or more service groups or addresses can share the same key.

| KeyTag (8) | AlgCode (4) | Key (16) |
|---|---|---|

-continued

KeyTag: Tag for the key. The key tag is used only internally for programming and accessing the key.
AlgCode: Encryption algorithtn code. This is for use with the security algorithms.
Key: The security key. The driver illustratively supports storage of 16 byte keys (128-bits) for future versions.

Overall Size=(8+4+16)*16=448 bytes

Service Group Info. Table and Service Group Index Table

The service group table stores information on the service groups. Typically, look up for service group code and associated key is a more frequent and time critical task than insertion or deletion of service groups. Thus, the driver preferably has a data structure designed to accommodate this.

In the suggested implementation below, service group entries are sorted by address numbers and then by service group codes. A separate Service group index table stores index for the last entry for any given address. (It should be noted that his is simply one example implementation. It is optimized for service group code look up and to minimize the storage requirement. It requires that each time a new service group is defined, the table entries be shifted down to make space for it. However, other suitable implementation can be used as well.

In one illustrative embodiment, when an address is disabled, its service group entries are not removed or altered in anyway (however, since the card discards the messages for that address anyway, these entries will not be used).

KeyIndex is the index into the Key Table that is associated with this service group. Index 0 is reserved to mean "no key exists—the content for this service group is not encrypted".

| Service Group Code (1) | Status (1) | Key-Index (1) | Expiration Date (2) | Service Group Tag (8) | Service Group Name (32)* | Description (64)* | | Index (1) |
|---|---|---|---|---|---|---|---|---|
| 0 × 20 | | 1 | 366 | Addr0Gp0 | | | / | Addr0 End |
| 0 × 21 | | 1 | 400 | Addr0Gp1 | | | / | Addr1 End |
| 0 × 20 | | 6 | 389 | Addr1Gp0 | | | / | |
| 0 × 30 | | 9 | 0 | Addr2Gp0 | | | / | |
| | | | | ... | | | | |
| | | | | ... | | | / | AddrN End |
| | | | | AddrNGpN | | | / | |
| (empty) | | | | (empty) | | | | |
| (empty) | | | | (empty) | | | | |

Fields marked with '*' can be stored in volatile memory (e.g. in the registry) to save memory size in the radio HW. These have not been included in the size calculations.

ServiceGroupCode Service group code in the printable ASCII range of 0×20 and 0×7E.

Status: This is a flag byte. The following flags are illustratively defined:

| Flag Name | Value | Meaning |
|---|---|---|
| GROUP_FLAG_ENABLE | 0x01 | If set, the service group is enabled (message received on service group will be processed). If not set, messages received on this service group are discarded by the driver. |
| GROUP FLAG_PRIORITY | 0x02 | If set, messages of this service group should be delivered to the higher levels immediately (e.g. Stock alert service group). If not set, the messages can be buffered internally for a later delivery. |

-continued

| Flag Name | Value | Meaning |
| --- | --- | --- |
| GROUP_FLAG_AC_ONLY | 0x04 | This service group is enabled only when external power is available. |
| GROUP_FLAG_PO_ONLY | 0x08 | This service group is enabled only when the device is powered on. |
| | 0x10–0x80 | Reserved for future use |

The driver preferably detects AC and device ON/OFF status changes to enable/disable service groups based on GROUP_FLAG_AC_ONLY and GROUP_FLAG_PU_ONLY.

KeyIndex: If non-0, index into the key table for the associated key. This key is used when a message arrives on this service group code.

ExpirationDate If non-0, it indicates the date on which this service group would be disabled. It is stored, for example, as number of days from Jan 1, 1997. A time 12:01AM is assumed. Note that card or the driver is illustratively not expected to act on this value—higher level applications will access and act on this value.

ServiceGroupTag: Tag for the service group. The service group tag is used only internally for programming and accessing the service groups.

ServiceGroupName: Descriptive name for the Service group (e.g. "International News", "Local Weather"etc.). Suggested size of this field is 32 but OEM can support more.

Description: Descriptive text for the service group (e.g. "News from all around the world that affects your little community"). Suggested size of this field is 64 but OEM can support more.

Index table is used to quickly locate a service group for a given address.

Overall Size=(1+1+1+2+8)*64=832 (Service group table)
(1)*16=16 (Index table)=848 bytes FIG. 6 also illustrates that driver 210 includes security component 226 and message specific key storage 228. FIG. 6 further illustrates that driver 210 preferably supports a library containing certain functions that are generic to the system, but which are preferably performed at the driver level for the sake of increased efficiency or security. The support library is statically linked to the remainder of the driver components. The driver support library illustrated in FIG. 6 includes the AnalyzeMessage function 230 and the DeriveEncryptionKey function 232. These functions are described in greater detail below. It should also be noted that, in a preferred embodiment, radio HW 208 and driver 210 support additional data structures and functions, respectively. However, the data structures and functions illustrated herein are those necessary for a clear understanding of the present invention.

Also, in a preferred embodiment, router 212 (which is typically implanted as an application program) is configured to use a number of I/O control calls to perform various operations. Driver 210 supports and implements the I/O control calls according to a predefined syntax and operation which is described below.

The general type definitions used in the driver API will now be described. It should be noted that most of the following types map substantially directly to the data structures described above, which are supported by radio HW 208, although this is not necessary.

The following basic types are used:

BYTE Unsigned 8-bit

WORD Signed 16-bit

DWORD Signed 32-bit

TEXT String stored in a BYTE array. Since the length of the string is usually available in another field, null termination is not required.

The following type definitions indicate illustrative minimum size which the driver needs to support. The struct used in the API have actual length in another field.

RADIO_TAG struct
TEXT Value[8] Tags are used to identify a particular address, service group, or key entry RADIO_KEY struct
BYTE Value[16] Stores the encryption keys.

RADIO_NAME struct
TEXT Value[32] Stores carrier name, manufacturer name, Address name, etc.

RADIO_DESC struct
TEXT Value[64] Stores description of the card, services, addresses, etc.

Complex Types (Structs)

All structures have the following two fields at the beginning:

WORD wStructSize Each struct has fixed size fields followed by the length of the variable fields. The variable fields follow in the same order as their lengths. The wStructSize field holds the size in bytes of the fixed part of the struct (i.e., fixed fields and the lengths of the variable fields). This field provides a versioning method as well that will be used for backward compatibility in the future releases.

DWORD dwMemberValidMask A mask indicating which fixed size fields of the struct are valid and can be used (for variable size fields, a length of 0 indicates that the field is not present). This allows us to use the same struct even if some fields are not required. This is especially useful when programming a single field within a struct without changing the values of other fields.

In addition the variable length fields are grouped towards the end a length field for each one of them is provided. This allows expanding these structures without losing backward or forward compatibility. When accessing the variable length fields, the driver should use the wStructSize field's value as the start offset for the first variable length field. This will allow for forward compatibilty when additional fields are added to the struct using wStructSize field ensures that these new fields will be ignored by the legacy drivers).

Although a wide variety of specific struct types are used in the normal operation of the driver API, only those related to the present invention are discussed herein. Such structs include the following:

Struct RADIO ADDRESS

This struct contains information about the address.

| Size | Field |
|---|---|
| 2 | WStructSize = sizeof (RADIO_ADDRESS) |
| 4 | DwMemberValidMask |
| 1 | AddressNumber |
| 1 | Status |
| 2 | ExpirationDate |
| 1 | AddressTagLen = $N_1$ |
| 1 | KeyTagLen = $N_2$ |
| 1 | AddressNameLen = $N_3$ |
| 2 | WDescriptionLen = $N_4$ |
| 2 | WAddressInfoLen = $N_5$ |
| $N_1$ | AddressTag |
| $N_2$ | KeyTag |
| $N_3$ | AddressName |
| $N_4$ | Description |
| $N_5$ | AddressInfo |

WORD wStructSize sizeof (RADIO_ADDRESS)
DWORD dwMemberValidMask A mask indicating which fields of the struct are valid. Construct the value by 'OR' ing one or more of the following:
    0 x 0001    AddressNumber field is valid
    0 x 0002    Status field is valid
    0 x 0004    ExpirationDate field is valid BYTE AddressNumber    Address entry number. address entries are numbered 0 onwards.
BYTE Status    Status flags.
BYTE ExpirationDate [2]    Expiration date. 0 if none.
BYTE AddressTagLen    Length of the AddressTag field.
BYTE KeyTagLen    Length of the KeyTag field.
BYTE AddressNameLen    Length of the AddressName field
WORD wAddressDescriptionLen    Length of the AddressDescription field.
WORD wAddressInfoLen    Length of the AddressInfo field.
RADIO_TAG AddressTag    Address Tag.

-continued

RADIO_TAG KeyTag    Associated key for this address. (If the field is not present, then no key is associated with the address).
RADIO_DESC AddressDescription    Description for the address. Note that this information is illustratively not required to be in non-volatile memory. It is displayed to the user for information purpose only.
RADIO_DESC AddressInfo    Address and associated information fields. This struct is protocol specific. For FLEX protocol it may contain the capcode information encoding collapse value, phase, address, etc.

Struct RADIO_GROUP
This struct contains information about the service group.

| Size | Field |
|---|---|
| 2 | wStructSize = sizeof (RADIO_GROUP) |
| 4 | DwMemberValidMask |
| 2 | WGroupNumber |
| 1 | Status |
| 1 | GroupCode |
| 2 | ExpirationDate |
| 1 | GroupTagLen = $N_1$ |
| 1 | KeyTagLen = $N_2$ |
| 1 | AddressTagLen = $N_3$ |
| 1 | GroupNameLen = $N_4$ |
| $N_1$ | GroupTag |
| $N_2$ | KeyTag |
| $N_3$ | AddressTag |
| $N_4$ | GroupName |
| $N_5$ | GroupDescription |

WORD wStructSize sizeof (RADIO_GROUP)
DWORD dwMemberValidMask A mask indicating which fields of the struct are valid. Construct the value by 'OR' ing one or more of the following:
    0 x 0001    GroupNumber field is valid
    0 x 0002    Status field is valid
    0 x 0004    GroupCode field is valid
    0 x 0008    ExpirationDate field is valid -continued WORD wGroupNumber   Service group number. Service groups are numbered 0 onwards.
BYTE Status         Status flags.
BYTE GroupCode      Service group code
BYTE ExpirationDate [2]   Expiratio date. 0 if none.
BYTE GroupTagLen    Length of the GroupTag field.
BYTE KeyTagLen      Length of the KeyTag field
BYTE AddressTagLen  Length of the GroupTag field.
BYTE GroupNameLen   Length of the GroupName field
WORD wGroupDescriptionLen   Length of the GroupDescription field
RADIO_TAG GroupTag   Service group Tag.
RADIO_TAG KeyTag     Associated key for this service group. (If the field is not present, then no key is associated with the service group).
RADIO_TAG AddressTag   Address this service group belongs to.
RADIO_DESC GroupDescription   Description for the service group. Note that this information is not required to be stored in the non-volatile memory. It is displayed to the user for information purpose only.

Struct RADIO_KEY

This struct contains information about the encryption keys

| Size | Field |
|------|-------|
| 2 | wStructSize = sizeof (RADIO_KEY) |
| 4 | DwMemberValidMask |
| 1 | KeyNumber |
| 4 | DwAlgCode |
| 1 | KeyTagLen = $N_1$ |
| 1 | KeyLen = $N_2$ |
| $N_1$ | KeyTag |
| $N_2$ | Key |

WORD wStructSize   sizeof (RADIO_KEY)
DWORD dwMemberValidMask   A mask indicating which fields of the struct are valid. Construct the value by 'OR' ing one or more of the following:
    0 x 0001   KeyNumber field is valid
    0 x 0002   dwAlgCode field is valid
BYTE KeyNumber   Key number. Keys are numbered 1 onwards.
DWORD dwAlgCode   Encryption algorithm code.
BYTE KeyTagLen   Length of the KeyTag field.
BYTE KeyLen   Length of the KeyTag field.
RADIO_TAG KeyTag   Key Tag.
RADIO_KEY Key   The encryption key.

Struct RADIO_CRYPT

This struct is used for cipher functionality related IO control calls.

| Size | Field |
|------|-------|
| 2 | wStructSize = sizeof (RADIO_CRYPT) |
| 4 | DwMemberValidMask |
| 4 | HCryptoProv |
| 4 | DwCryptoFlags |
| 4 | DwCryptoAlgId |
| 1 | AddressTagLen = $N_1$ |
| 1 | GroupTagLen = $N_2$ |
| 2 | wMsgSpecificDataLen = $N_3$ |
| $N_1$ | AddressTag |
| $N_2$ | GroupTag |
| $N_3$ | MsgSpecificData |

WORD wStructSize   sizeof (RADIO_CRYPT)
DWORD dwMemberValidMask   A mask indicating which fields of the struct are valid. Construct the value by 'OR' ing one or more of the following:
    0 x 0001   hCryptoProv field is valid
    0 x 0002   dwCryptoFlags field is valid
    0 x 0004   dwCryptoAlgId field is valid
HCRYPTPROV hCryptoProv   handle to a Cryptography Service Provider
DWORD dwCryptoAlgId   Cryptography Algorithm ID, e.g. CALG_RC4
DWORD dwCryptoFlags   Flags for Cryptography function CryptDeriveKey ( ) e.g. CRYPT_EXPORTABLE
BYTE AddressTagLen   Length of the AddressTag field
BYTE GroupTagLen   Length of the GroupTag field
WORD wMsgSpecificDataLen   Length of MsgSpecificData field.
RADIO_TAG AddressTag   Address Tag
RADIO_TAG GroupTag   Service group Tag BYTE MsgSpecificData[ ]   Message specific data As stated above, the I/O control calls are made from router 212 to driver 210 in order to accomplish certain operations. As with the various data structures, a variety of I/O control calls are supported in the driver API. However, only those related to the present invention are discussed herein. I/O control calls have the following syntax:

Syntax

```
BOOL        xxx_IOControl
    DWORD       hOpenContext
    DWORD       dwCode
    PBYTE       pBufIn
    DWORD       dwLenIn
    PBYTE       pBufOut
    DWORD       dwLenOut
    PDWORD      pdwActualOut
);
```

Parameters

| | |
|---|---|
| hOpenContext | Specifies a handle identifying the open context of the device. The xxx_Open function creates and returns this identifier. |
| dwCode | Specifies a value indicating the I/O control operation to perform. These codes are device specific, and are usually exposed to application programmers by means of a header file. |
| pBufIn | Points to the buffer containing data to be transferred to the device. |
| dwLenIn | Specifies the number of bytes of data in the buffer specified for pBufIn. |
| pBufOut | Points to the buffer used to transfer the output data from the device. |
| dwLenOut | Specifies the maximum number of bytes in the buffer specified by pBufOut |
| pdwActualOut | Points to DWORD buffer the function uses to return the actual number of bytes received from the device. |

Return Value

Returns TRUE if the device successfully completed its specified I/O control operation, otherwise it returns FALSE.

RADIO_GET_XXX_INFO

This IOCTL call allows the caller to get information about carrier, manufacturer, card, etc. The IO control codes are:

RADIO_GET_CARRIER_INFO Gets RADIO_CARRIER_INFO struct

RADIO_GET_MANUFACTURER_INFO Gets RADIO_MANUFACTURER_INFO struct

RADIO_GET_DRIVER_INFO Gets RADIO_DRIVER_INFO struct

RADIO_GET_HW_INFO Gets RADIO_HW_INFO struct

RADIO_GET_ADDRESS_INFO Gets RADIO_ADDRESS struct (see remarks below)

RADIO_GET_GROUP_INFO Gets RADIO_GROUP struct (see remarks below)

RADIO_GET_KEY_INFO Gets RADIO_KEY struct (see remarks below)

Syntax

For Carrier, Manufacturer, Driver, and HW info:
  struct RADIO_xxx_INFO Radio_xxx_Info;

```
BOOL              xxx_IOControl(
  DWORD             hOpenContext
  DWORD   dwCode =        RADIO_GET_xxx_INFO
  PBYTE   pBufIn =        NULL
  DWORD   dwLenIn =       0
  PBYTE   pBufOut =       &Radio_xxx_Info
  DWORD   dwLenOut =      sizeof (Radio_xxx_Info)
  PDWORD  pdwActualOut =  &dwWriteBytes
);
```

For Address, Group, and Key info:
  BYTE pInBuf[IN_BUF_SZ], pOutBuf[OUT_BUF_SZ]; // initialize input
  (RADIO_xxx *)pInBuf->wStructSize=sizeof (RADIO_xxx);
  (RADIO_xxx *)pInBuf->member=. . .
  (RADIO_xxx *)pInBuf->dwMemberValidMask=. . .

```
BOOL              xxx_IOControl(
  DWORD             hOpenContext
  DWORD   dwCode =        RADIO_GET_xxx_INFO
  PBYTE   pBufIn =        pInBuf;
  DWORD   dwLenIn =       IN_BUF_SZ;
  PBYTE   pBufOut =       pOutBuf;
  DWORD   dwLenOut =      OUT_BUF_SZ;
  PDWORD  pdwActualOut =  &dwWriteBytes
);
```

Operation

This IO control call Returns the requested information struct. In one illustrative embodiment, for Address, Group, and Key info, the input buffer containing the corresponding struct must be given and that struct must have either number or tag member initialized. For example, RADIO_GET_ADDRESS_INFO requires that either AddressNumber or AddressTag member in pInBuf[] is set to the desired address. If both are given then AddressNumber will be used.

If pBufOut is NULL and dwLenOut is 0, the call returns the number or bytes required for the data in pdwActualOut. The caller can then allocate a buffer of that size and make this call again.

Remarks

Also, in one illustrative embodiment, for RADIO_GET_ADDRESS_INFO call, AddressInfo field is NEVER returned. This is to protect the programming information. Further, illustratively, for RADIO GET_KEY_INFO call, Key field is NEVER returned. This is to protect the encryption keys.

RADIO CRYPT DERIVE KEY

This IOCTL call allows the caller to program or un-program an address, service group, keys, or carrier information.

Syntax

```
BOOL              xxx_IOControl(
  DWORD             hOpenContext
  DWORD   dwCode =        RADIO_CRYPT_DERIVE_KEY
  PBYTE   pBufIn =        &RadioCrypt
  DWORD   dwLenIn =       sizeof (RadioCrypt)
  PBYTE   pBufOut =       &hKey
  DWORD   dwLenOut =      sizeof (hKey)
  PDWORD  pdwActualOut =  &dwWriteBytes
);
```

Operation

This IO control is used by the security component of the system. It is used to get a handle to a key. Since this requires access to Electroinc ID (EID) that should illustratively not be exposed outside of the driver. A function DeriveEncryptionKey( ) is illustratively provided in the driver support library and is discussed in greater detail below to carry out the operation of this IO control. The driver should call this function and pass the handle to the key (hKey) returned by it. This way, a security component can get a handle to the key without getting access to the EID.

In order to implement the I/O control calls, driver 210 calls a number of the functions stored in its support library. Such functions are described below:

AnalyzeMessage( )

Syntax

| BOOL | AnalyzeMessage( |
|---|---|
| void | *pMsg |
| DWORD | dwMsgLen |
| BOOL | *pDiscard |
| BYTE | *pServiceGroupcode); |
| pMsg | Pointer to the message bytes. |
| dwMsgLen | Length of the message. |
| pDiscard | Receives a BOOL value indicating whether the message should be discarded or kept. | pServiceGroupCode Receives the Service Group code.
Returns
    Returns TRUE if service group code was found, FALSE otherwise.
Description
    This function analyzes the message to determine if it has a service group code. It may also analyze it for other characteristics to make a determination if this message should be kept or discarded.
DeriveEncryptionKey( )
Syntax

| BOOL | | DeriveEncryptionKey( |
|---|---|---|
| RADIO_CRYPT | | *pCryptInput, |
| BYTE | | *pbKeyValue, |
| DWORD | dwKeySizeHCRYPTKEY | * phKey, |
| ); | | |

Some parameters to this function are provided by the caller, the driver simply passes them to this function. The rest of the parameters are available to the driver in its internal data structure
    pCrypt_Input Input to the RADIO_CRYPT_DERIVE_KEY IOCTL call.
    pbKeyValue The key that needs to be used. based on the AddressTag and GroupTag fields within the RADIO_CRYPT structure (The caller to the IOCTL call provides these two fields, the driver needs to use them to locate the key stored in the Key table and then pass the key in pbKey parameter)
    dwKeySize Number of bytes in the pbKeyValue parameter.
Returns
    This function returns TRUE if the operation was successful, FALSE otherwise. If successful, it also returns a handle to the key produced from the given information.
Description
    Encryption keys are illustratively derived based on one or more of the following information: key associated with the address, key associated with the service group, message specific data, certain flags, and an algorithm ID. This function processes all this and produces a handle to a key that can be used by the calling process to perform encryption/decryption operations.

FIG. 6 further illustrates that security component 226 includes a cryptography application programming interface (CryptoAPI or CAPI) 236, as well as a cryptographic service provider 238. CAPI 236 provides a set of functions that allow other software components to decrypt data in a flexible manner. In one preferred embodiment, CAPI 236 is implemented as the cryptographic application programming interface (CryptoAPI) commercially available from the Microsoft Corporation of Redmond, Washington. The Cryptographic service provider 238 is preferably an independent module which performs cryptographic operations. One such cryptographic service provider is commercially available under the tradename Microsoft RSA Base Provider. However, other cryptographic service providers could be used as well. Some such cryptographic service providers provide stronger cryptographic algorithms, while others contain hardware components, such as smart cards. Thus, program modules can use functions exposed by CAPI 236 without having knowledge of the underlying cryptography algorithms.

In accordance with one illustrative aspect of the present invention, content provider 12 and carrier 14 can send both encrypted programming messages which are used to program values in radio HW 208, as well as encrypted content messages which can only be received and processed by mobile devices 18 having the appropriate decryption keys which can be used to decrypt the content messages for further use by mobile device 18. Driver 210 is configured to maintain the integrity of the encryption keys in a secured environment, even during decryption of either programming messages or content messages.

Radio HW 208 has a number of programmable address slots. Also, in order to extend the number of purposes to which each address can be applied, the present invention further divides broadcast addresses into subaddresses called groups designated by group codes. For example, an address may be used to transmit news information, while a group code may be used to transmit subdivisions of the news, such as national news, local news and international news.

In a preferred embodiment, mobile device 18 stores an encryption key for each broadcast address as well as each group code. Alternatively, one key can be used for an address and all its groups, or for any other combinations involving addresses and groups. Mobile device 18 is also preferably preprogrammed with an electronic identification (EID) which is created and assigned by the manufacturer of mobile device 18 during production. The EID is preferably randomly generated and is not based on or related in any way to the serial number of the device (which may be visible from the outside of the device). The EID is kept confidential to the manufacturer of mobile device 18 and wireless carrier 14.

Thus, in order to provide efficient subscription management, a number of operations need to be performed. First, content provider 12 and carrier 14 are preferably arranged to program mobile device 18 with addresses and group codes over which the user of mobile device 18 can receive desired services. In order to provide services to only desired or selected mobile devices 18, which have subscribed to the services, both programming messages which are used to program the addresses and group codes into mobile device 18, and content messages, are encrypted. Therefore, content provider 12 and wireless carrier 14 are also preferably configured to program mobile device 18 with the necessary encryption keys for decrypting programming messages and content messages.

The addresses are preferably owned by the wireless carrier 14, while the group codes may be owned by content provider 12 or wireless carrier 14. Therefore, in order to manage its subscriptions, content provider 12 is preferably configured to reprogram mobile device 18 with new group keys (or broadcast keys) through wireless carrier 14, without having the ability to change the group keys (or broadcast keys) of other content providers which may be providing services through wireless carrier 14, or through other wireless carriers. This allows content provider 12 to rotate the encryption keys used in encrypting content messages to enhance security of the transmission system.

Of course, since the content messages from content provider 12 are encrypted, content provider 12 is preferably configured to encrypt those messages, in a secure fashion, such that they can be decrypted by only those mobile devices 18 containing the requisite broadcast keys.

Further, since both programming messages and content messages are encrypted, mobile device 18 is preferably configured such that it can decrypt those messages, in a secure fashion, so as to maintain the integrity of the encryption keys that are used in encrypting and decrypting the messages.

Programming Mobile Device 18

Figure 7:
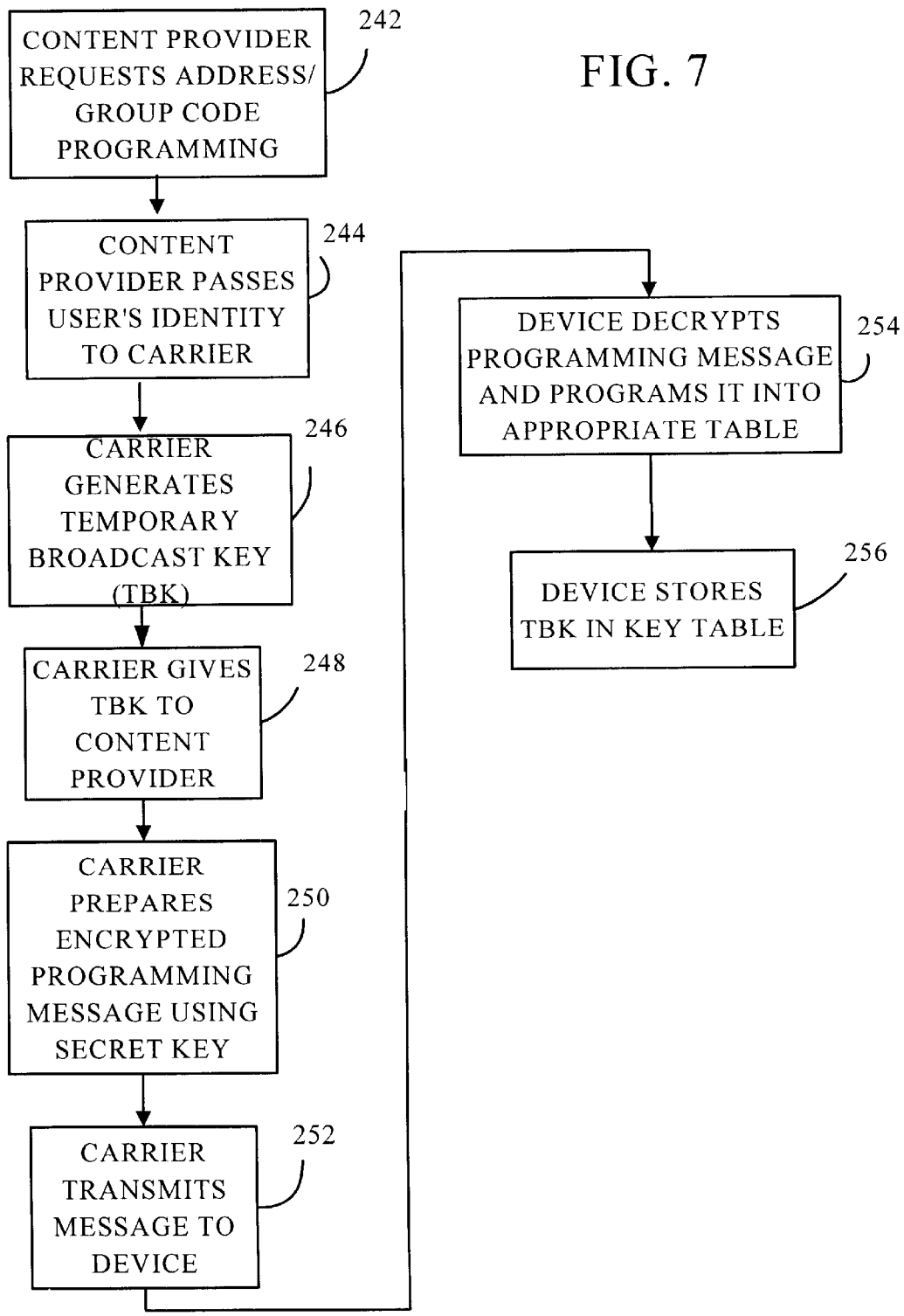
FIG. 7 is a flow diagram illustrating programming of a broadcast key into the mobile device illustrated in FIG. 6.

FIG. 7 is a flow diagram which will be discussed in conjunction with FIG. 6, and which illustrates how content provider 12 and wireless carrier 14 program addresses, group codes and corresponding encryption keys into mobile device 18 to enable a new subscriber to receive the desired services. Programming of a mobile device 18 is described in greater detail in the above-identified U.S. patent application which is hereby fully incorporated by reference. Therefore, it will only be briefly discussed here, for the sake of understanding the remaining features and the remaining aspects of the present invention.

Content provider 12 receives an indication from a particular user of a mobile device 18 that the user wishes to receive a subscription to certain services. Therefore, content provider 12 requests wireless carrier 14 to program an appropriate group code or address into the desired mobile device 18. This is indicated by block 242 in FIG. 7. Content provider 12 then passes to wireless carrier 14 the identity of the user, such as the serial number of the pager or other mobile device 18 being used by the user. This is indicated by block 244.

In response, wireless carrier 14 generates a temporary random broadcast key to be temporarily used by content provider 12 in transmitting the services to mobile device 18. Wireless carrier 14 then provides the temporary broadcast key back to content provider 12. This is indicated by blocks 246 and 248.

Wireless carrier 14 then prepares an encrypted programming message using a secret key, known only to wireless carrier 14 and the particular mobile device 18 being programmed. The secret key may, for example, be the EID programmed into mobile device 18 by the manufacturer of mobile device 18, and shared only with wireless carrier 14. This is indicated by block 250. Wireless carrier 14 then transmits the programming message to mobile device 18. This is indicated by block 252.

Mobile device 18 receives the programming message, identifies it as a programming message, and decrypts the message. Mobile device 18 then makes the new address or group code available to radio HW 208, which programs the new address or group code into the appropriate table on radio HW 208. This is indicated by block 254. Mobile device 18 also makes the temporary broadcast key (which was also transmitted with the programming message) available to radio HW 208, which programs the temporary broadcast key into key table 224. This is indicated by block 256. The temporary broadcast key is associated with the newly programmed address or group code (or both) and is used by mobile device 18 in decrypting at least the first encrypted message originated by content provider 12.

It should be noted that wireless carrier 14 can send another programming message, in a similar fashion, to mobile device 18, in order to disable the new address or group code. For example, if the user of mobile device 18 wishes to drop the subscription, wireless carrier 14 can provide a programming message essentially removing the new address or group code from mobile device 18. Similalry, if the user drops out only temporarily (such as goes on vacation or ceases paying the subscription fee) content provider 12 can generate a programming message (which can be sent to only the particular mobile device 18 through wireless carrier 14) which disables the new address or group code. In either case, the user of mobile device 18 will no longer be able to receive content messages from content provider 12.

Changing Broadcast Keys

Figure 8A:
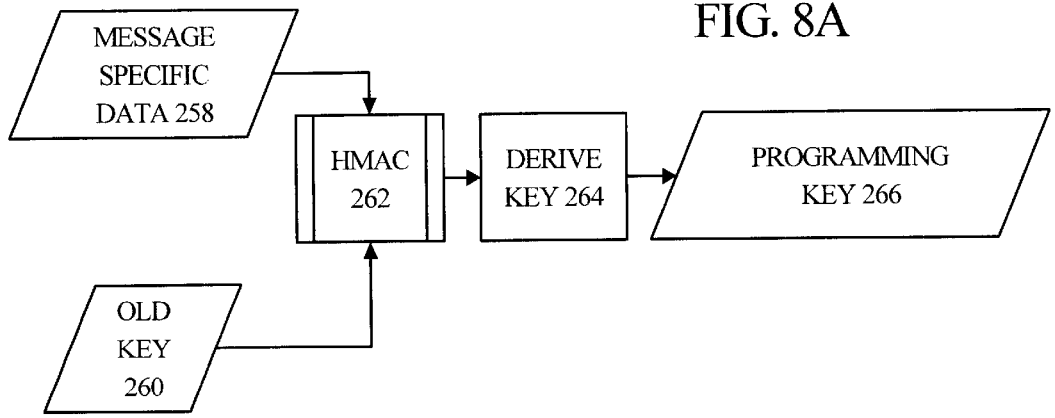
FIGS. 8A, 8B and 8C illustrate the generation of a programming message used to program a broadcast key into the mobile device illustrated in FIG. 6.
Figure 8B:
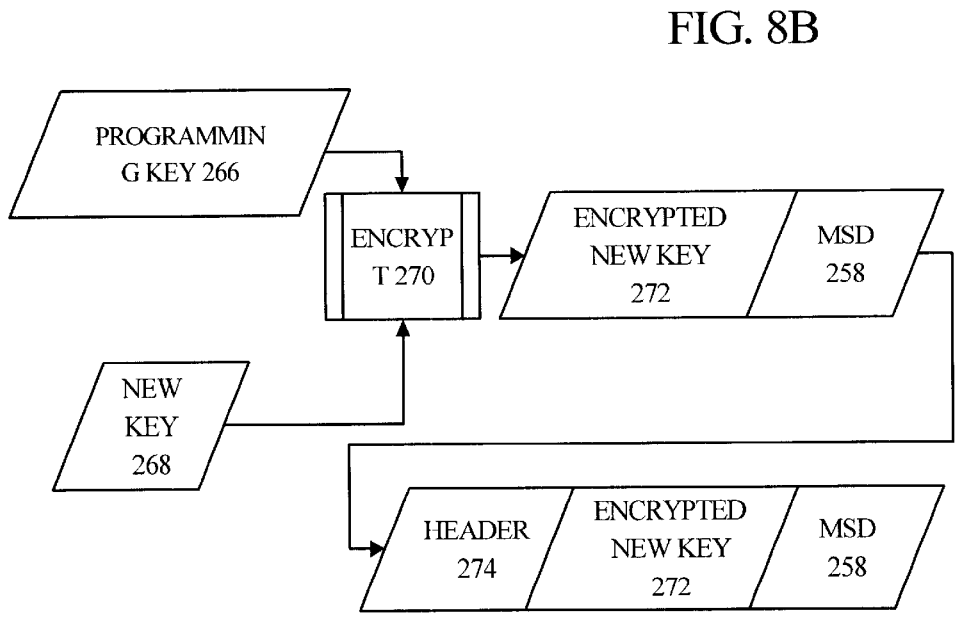
Figure 8C:
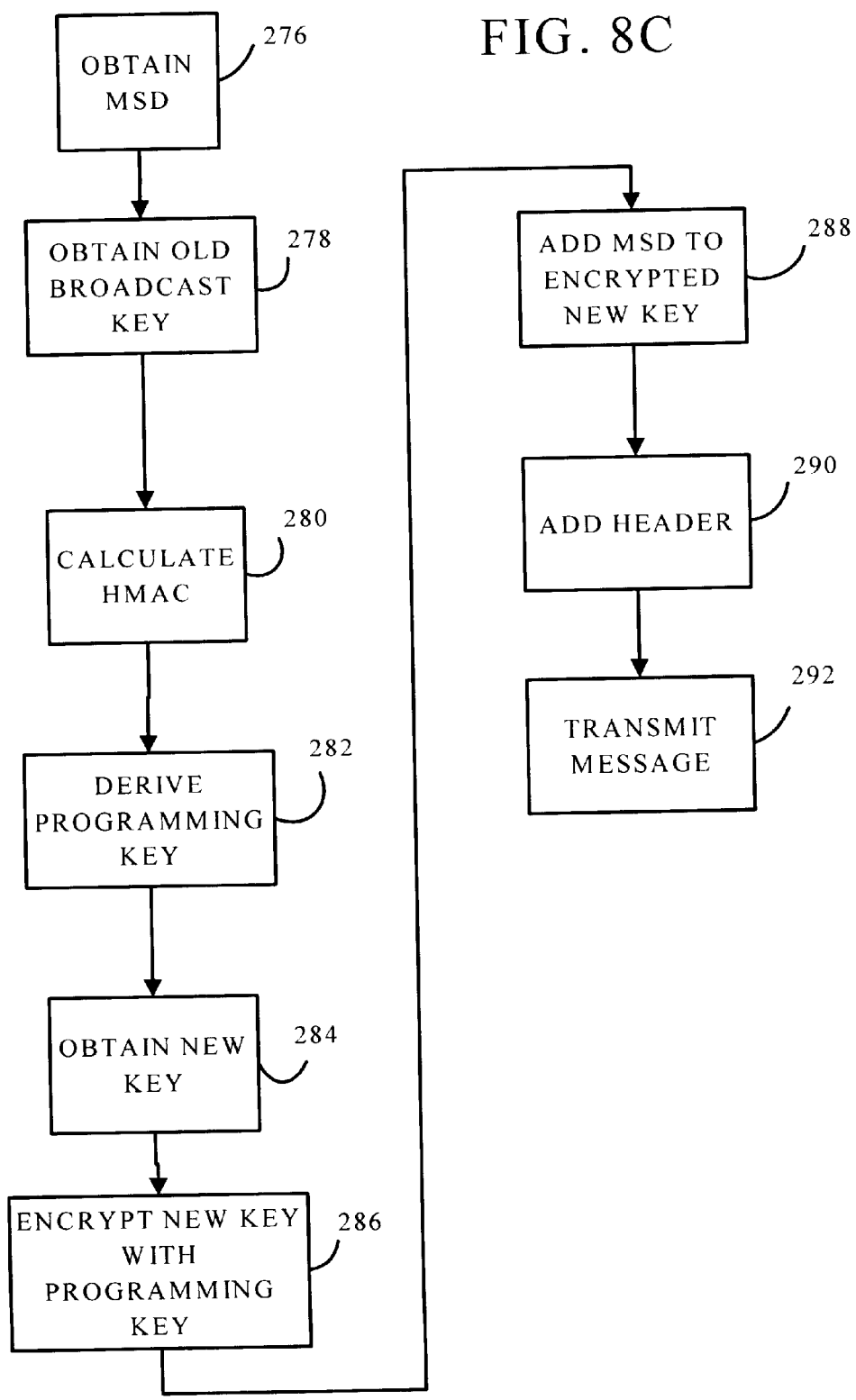

FIGS. 8A–8C are diagrams illustrating how content provider 12 changes the temporary broadcast key to its own broadcast key, or simply rotates the broadcast key currently contained in mobile device 18. FIGS. 8A–8C are also described in conjunction with FIG. 6. Of course, other suitable encryption schemes can be utilized, but FIGS. 8A–8C illustrate one illustrative encryption scheme. Specifically, FIGS. 8A and 8B illustrate the formation of an encryption key (designated programming key) and an encrypted message in accordance with one aspect of the present invention.

In order to obtain the programming key, the present invention uses message specific data 258 and the old key 260 currently stored on mobile device 18. In the instance where content provider 12 is changing the temporary broadcast key, old key 260 corresponds to the temporary broadcast key then stored on mobile device 18. Message specific data 258 is preferably a part of the old key 260, itself, but can be other message specific information as well. Thus, message specific data 258 changes with each message being sent. The old key 260 is generated (or retrieved) by message generator component 202 and is provided, along with message specific data 258 to cryptography component 200 in content provider 12 (all of which are shown in FIG. 6). Cryptography component 200 provides message specific data 258 and the old key 260 to a hashed message authentication code (HMAC) generator 262. HMAC generator 262 derives a hash value that is used for biasing a key derivation algorithm. The HMAC produced value has the following property: its value depends upon the input data (MSD 258 and old key 260) and even a single bit change in any of them will cause a completely new hash value. At the same time, given a hash value, it is extremely difficult to decipher what input data was used to generate it.

The biasing component is provided to key derivation component 264, which acts upon the biasing component in order to derive programming key 266. Since MSD 258 is used to generate the biasing value and MSD 258 changes for each message, it is clear that programming key 266 will change for each programming message even if it is meant for the same mobile device. This makes it extremely difficult for anyone to decipher the programming key (if the same key is used repeatedly in a stream cipher to encrypt multiple messages, then knowing or guessing a single message is sufficient to reveal the rest). Furthermore, even if the key is deciphered, it is useless as the next message will not use the same key. Therefore, the present system is highly secure unless an unauthorized user knows a multitude of information, such as MSD 258, old key 260, the HMAC 262 algorithm, etc.

Programming key 266 is used to encrypt the new broadcast key which will be used by mobile device 18 in order to decrypt messages received over the new address or group code programmed into mobile device 18. In one illustrative embodiment, the API CryptDeriveKey is used in order to derive programming key 266. The API CryptDeriveKey is a standard Windows API which derives the key for standard cryptography algorithms.

FIG. 8B illustrates the encryption of the new key 268 using programming key 266. Programming key 266 and new key 268 are provided to encryption component 270 which encrypts new key 268 using programming key 266. Any suitable encryption technique can be used by encryption component 270. The output of encryption component 270 is an encrypted new key 272. The encrypted new key 272 is then passed back to message generator component 202 at content provider 12. Message generator component 202 then appends the message specific data 258, in unencrypted form, to the encrypted new key 272. Message generator component 202 then adds header 274 to the encrypted new key 272 and message specific data 258. Header 274 is preferably a sequence of bytes which serves a number of purposes. First, it identifies a message as a programming message. Next, it identifies the start and end of the encrypted portion 272 of the message, and the start and end of the message specific data portion 258 of the message (which is not encrypted). Finally, header 274 identifies whether the EID (or other secret key) was used in the derivation of the message. It should be noted that wireless carrier 14 may be provided with the responsibility for adding header 274 to the message. In any case, the message is then provided to wireless carrier 14 which places the message in proper form for transmission over the transmission link, and transmits the message to mobile device 18.

FIG. 8C is a flow diagram illustrating the generation of the programming message illustrated in FIGS. 8A and 8B. First, the message specific data (or other data) is obtained, along with the old broadcast key. This is indicated by blocks 276 and 278. The hash value is then calculated as indicated by block 280. The programming key is then derived based on the hash value generated in block 280. This is indicated by block 282.

The new key is then obtained and encrypted with the programming key. This is indicated by blocks 284 and 286. The message specific data and header are then added to the encrypted new key, and the message is transmitted. This is indicated by blocks 288, 290 and 292.

Once mobile device 18 receives the programming message, the programming message is decrypted in order to obtain the new key associated with the address or group code programmed on mobile device 18, and the new key 268 is programmed into key table 224. This process is described in greater detail in the above-identified patent application hereby fully incorporated herein by reference. Briefly, the mobile device illustratively follows basically the same steps as in FIGS. 8A and 8B. If the device does not have the old key then it cannot complete these steps and consequently cannot decrypt the message successfully. Thus, only an authorized device is able to successfully decrypt and use the programming message.

Generation of Encrypted Content

Figure 9A:
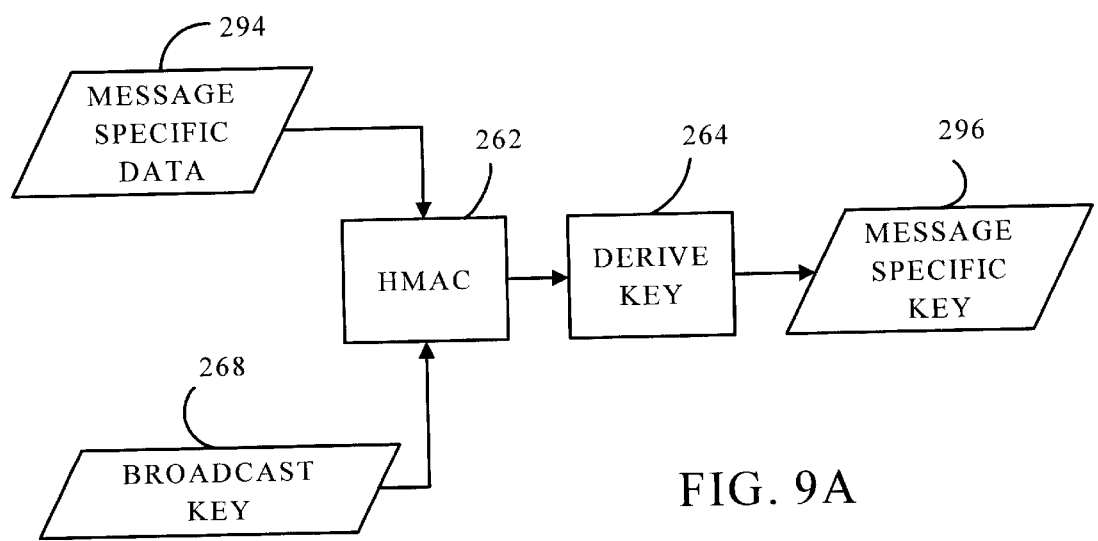
FIGS. 9A–9C illustrate the generation of an encrypted content message in accordance with one aspect of the present invention.
Figure 9B:
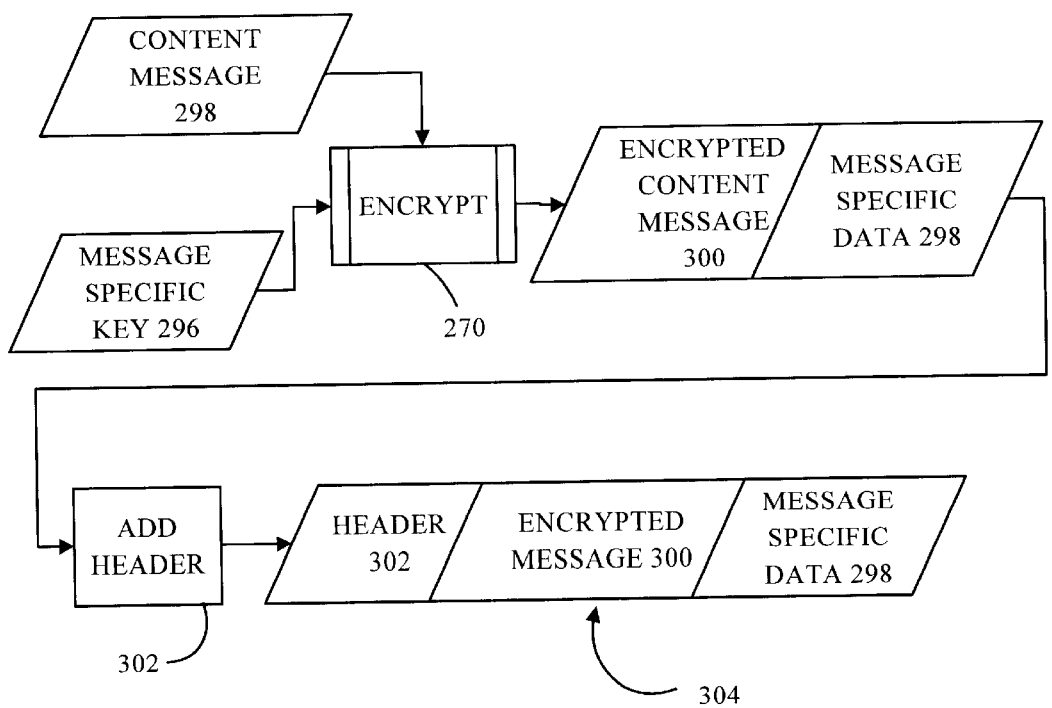
Figure 9C:
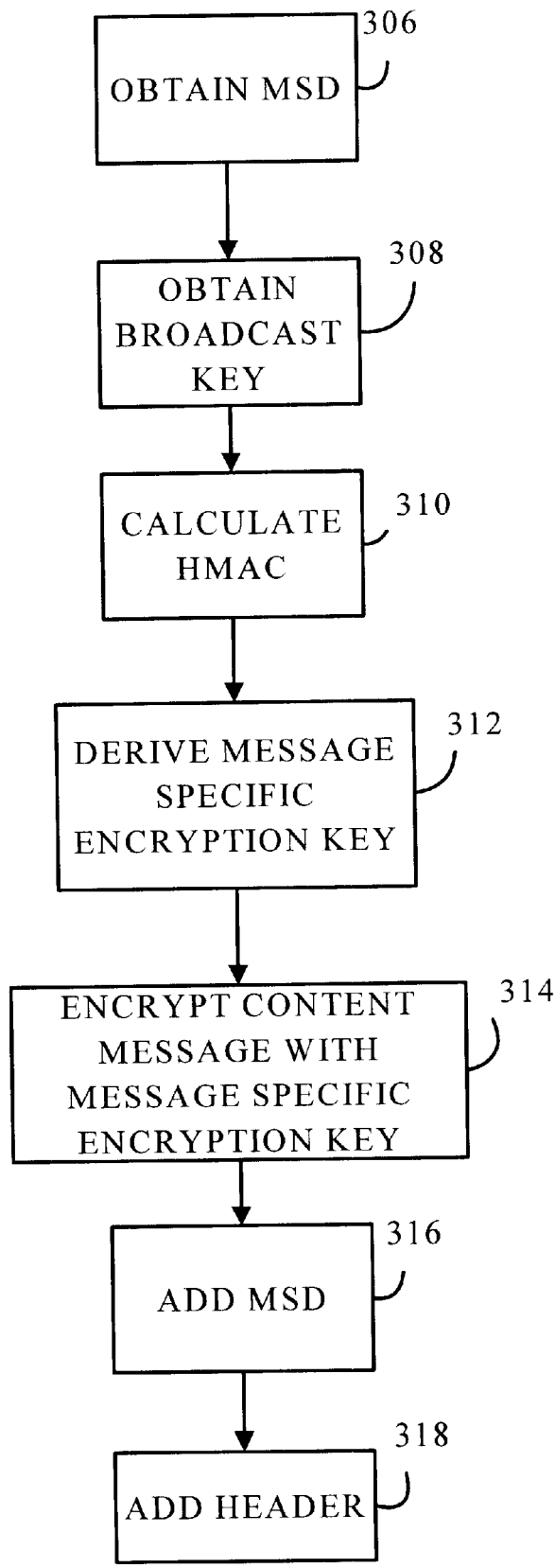

Once mobile device 18 has been programmed with the new address or group code and the corresponding decryption key or keys, content provider 12 can generate an encrypted content message for transmission to mobile device 18 by wireless carrier 14. FIGS. 9A–9C illustrate one illustrative embodiment in which content provider 12 generates an encrypted content message for transmission, via wireless carrier 14, to mobile device 18.

Content provider 12 first obtains the current broadcast key 268 which is currently stored on mobile device 18 and which corresponds to the address or group code over which the encrypted content message is to be sent. Only the authorized mobile devices have this key stored in them using the method described above with respect to FIGS. 8A, 8B and 8C. Content provider 12 also obtains message specific data 294 which is preferably part of the content message being transmitted and has the property that it changes with each message (to ensure that the message specific encryption key 296 described below is different for each message thereby reducing the probability of malicious attack). Broadcast key 268 and message specific data 294 are provided to HMAC component 262 which derives a hash value used to derive a message specific encryption key 296. HMAC component 262 and key derivation component 264 can implement the same techniques as described above with respect to FIG. 8A.

FIG. 9B illustrates that the particular content message 298 being sent is encrypted with the message specific encryption key 296 by encryption component 270. Encryption component 270 can also implement the same encryption algorithm or encryption techniques as described above with respect to FIG. 8B. Encryption component 270 provides, at its output, encrypted content message 300. Message specific data 298 is then appended to encrypted content message 300, in unencrypted form. An appropriate header 302 is added to form the complete content message 304 to be sent to mobile device 18.

FIG. 9C is a flow diagram illustrating the generation of content message 304. First, the message specific data 294 and broadcast key 268 are obtained and the hash value is calculated. This is indicated by blocks 306, 308 and 310. Next, the message specific encryption key is derived and the content message is encrypted using the message specific encryption key. This is illustrated by blocks 312 and 314. Message specific data is then added to the encrypted content message, as is the header. This is indicated by blocks 316 and 318.

It should be noted that, in the above description, the broadcast key or the message specific encryption key need not be sent along with the encrypted content message. Only message specific data used in deriving the encryption key is sent, which changes with each message. For successful decryption of the encrypted message, the recipient must have the missing information namely, broadcast key, HMAC algorithm, and the knowledge of how to interpret the message header which identifies what part is encrypted and what part is the MSD 294. This adds to the integrity of the transmission system.

Decryption of the Encrypted Content Message

Figure 10A:
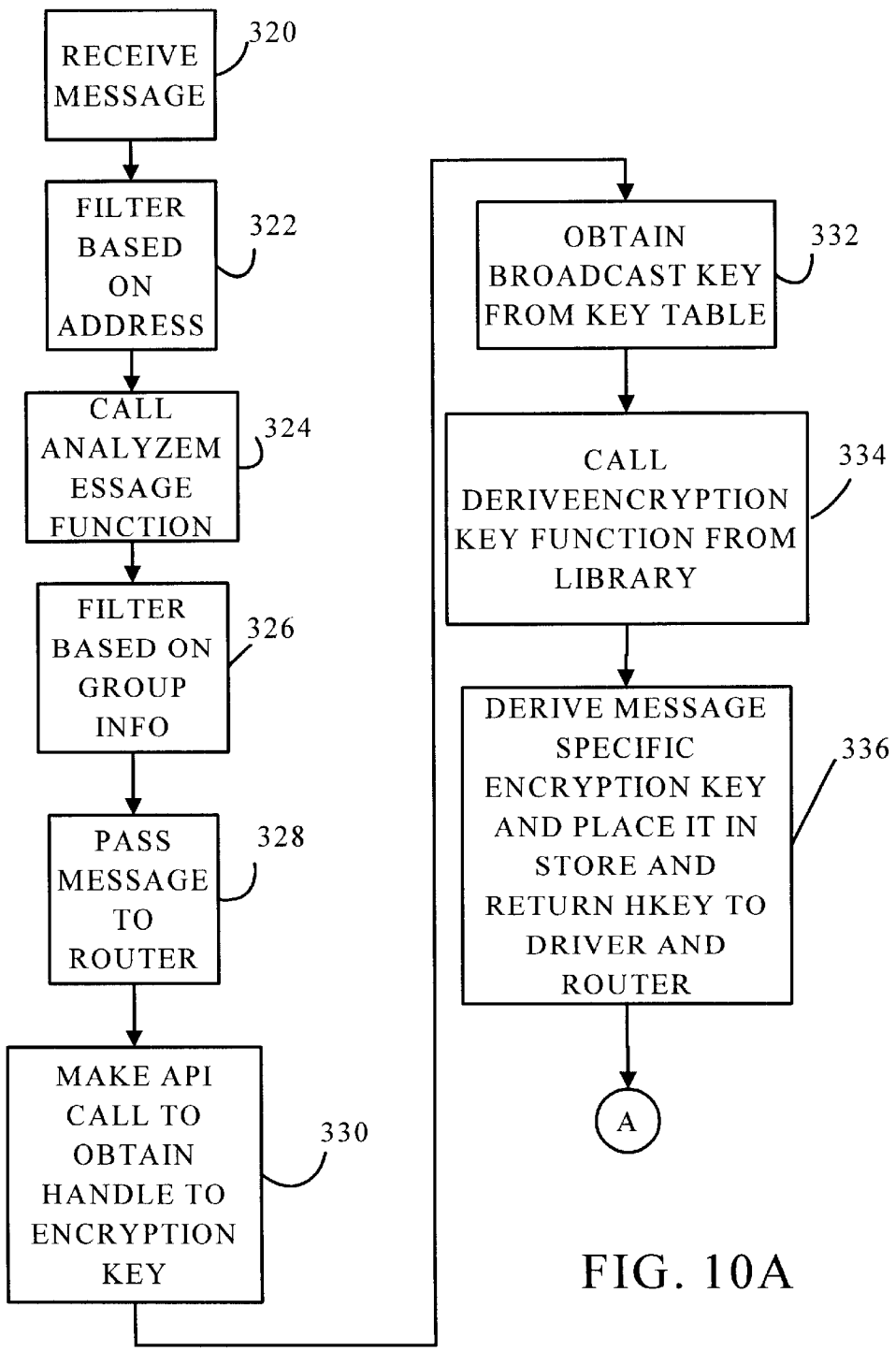
FIGS. 10A and 10B are flow diagrams illustrating decryption of an encrypted content message.
Figure 10B:
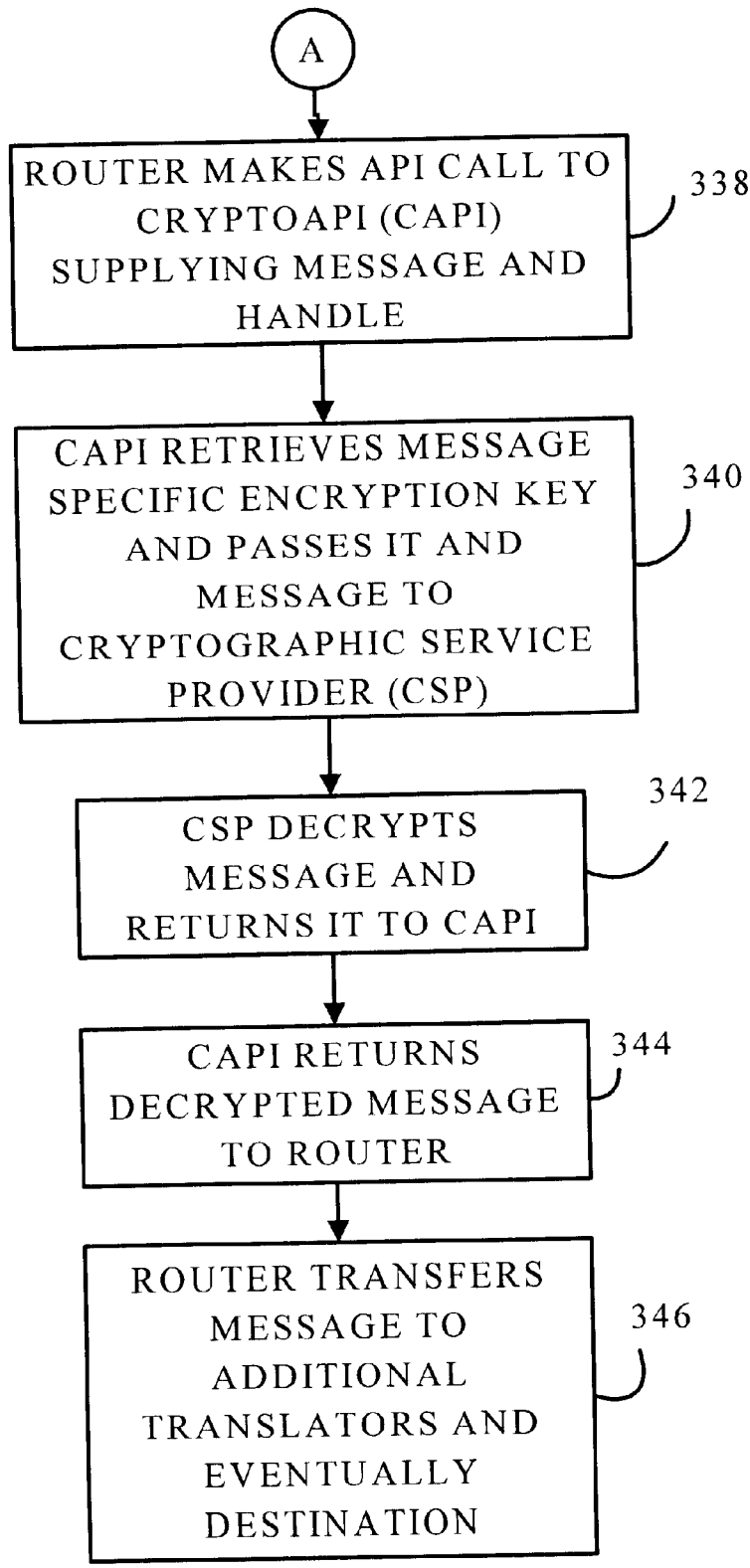

FIGS. 10A and 10B are flow diagrams, which are discussed in conjunction with FIG. 6, and which illustrate decryption of a content message, once it is received by mobile device 18. First, the message is received by control circuit 218 and radio HW 208. Control circuit 218 preferably includes a microprocessor, or microcontroller, as well as the antenna and actual radio receiver hardware on mobile device 18. Control circuit 218 also preferably includes associated clocking circuitry and memory, along with appropriate input and output buffers.

Control circuit 218 is configured to receive the message according to the particular transmission constraints imposed upon the channel by wireless carrier 14. For example, if the message is packetized and the packets are sent in random fashion, control circuit 218 (or control circuit 218 in conjunction with driver 210) receives the packets and arranges them in order to form a coherent message. Control circuit 218 preferably also implements logic which determines whether a full packet or partial packet has been received. Reception of the message is indicated by block 320 in FIG. 10A.

Once the message is received, radio HW 208 accesses information in the address information table 220 to determine whether the address over which the message was transmitted corresponds to an address currently programmed into radio HW 208. Control circuit 218 filters messages based upon whether they are received over an address which is enabled and currently unexpired. This is indicated by block 322.

If the message corresponds to an address on radio HW 208, the message is placed in the output buffers of control circuit 218 for reception by driver 210. Driver 210 receives the message and calls the AnalyzeMessage function 230 contained in its function library. The AnalyzeMessage function 230 analyzes the message to determine whether it has an associated group code. Recall that message content can be sent over an address or group code or both. This is indicated by block 324.

If group code information exists, driver 210 must do further processing in order to determine whether radio HW 208 has been programmed with the appropriate group code. To do so, driver 210 uses the group table. (If the group table is stored in the radio HW 208, device driver 210 is provided with access to it using hardware specific mechanisms such as reading the radio HW memory directly etc. Based on the group table content, driver 210 can perform further filtering on the message to determine whether it should be discarded. This is indicated by block 326.

If the message has not been filtered out, driver 210 passes the message to router 212. This is indicated by block 328.

Based on the header information contained in the massage, router 212 determines that the message is an encrypted content message which must be decrypted for further use by mobile device 18. Router 212 thus makes an API call to driver 210 such that driver 210 can derive the message specific encryption key which will be used to decrypt the message. In doing so, router 212 (or another application) makes a driver IO control call to obtain a handle to the encryption key. The call includes the message specific data which was appended to the message in unencrypted form, and the address and group over which the message was received. This is indicated by block 330. Based on the address and group information passed as part of the IO control call, driver 210 obtains the broadcast key from the key table. This is indicated by block 332. Driver 210 then calls the DeriveEncryptionKey function 232 from its function library. This is indicated by block 334. The DeriveEncryptionKey function 232 uses the key or keys associated with the address or group code over which the message was transmitted along with the message specific data which was appended to the message in unencrypted form, in order to re-derive the message specific encryption key 296. It should be noted that the key table is securely stored and is accessible by the device driver 210 alone, and thus only device driver 210 can make the correct DeriveEncryptionKey( ) API call.

Re-deriving key 296 can be done by simply rerunning the hash algorithm implemented by HMAC component 262 and the key derivation algorithm executed by key derivation generator 264 in creating the message specific key.

The library function thus derives the message specific key 296, which was used to encrypt the content message, and stores the message specific key 296 in message specific key storage 228. The function also returns a handle hKey to driver 210 (which provides it, in turn, to router 212) which indicates a location in message specific key storage 228 in which the message specific key is stored. This is indicated by block 336.

In response, router 212 makes an API call to CAPI component 236 in security component 226, providing hKey and the encrypted content message. CAPI component 236 retrieves the message specific key stored in storage 228 and provides the message specific key, along with the encrypted content message, to cryptographic service provider 238. This is indicated by blocks 338 and 340.

Cryptographic service provider 238 decrypts the content message and provides it, in unencrypted form, to CAPI component 236 which, in turn, provides the decrypted message back to router 212. This is indicated by blocks 342 and 344. Router 212 then passes the message to additional translators 214, if necessary. Such translators can be invoked to decompress the message, if it was compressed, to unencode the message, if it was encoded, etc. The message is then provided to its destination 216, which may be an application program for displaying the content message on the screen of mobile device 218 or other desired destination. This is indicated by block 346.

It should be noted that the above description has proceeded illustrating that router 212 is the component that primarily controls the decryption process. However, this could be done by any other application as well. For instance, in one preferred implementation, this process is performed by a separate decryption translator.

Thus, it can be seen that the above-described embodiment of the present invention provides a system in which content provider 12 and wireless carrier 14 can program mobile device 18, through a suitable transmission link (such as over-the-air), with subscription information in a secured fashion. This allows only subscribing users of mobile devices 18 to receive the subject services. Another of the aspects of the present invention described above provides a system by which encrypted content messages can be decrypted for use by mobile device 18, without the broadcast key used to encrypt the content messages ever leaving driver 210. The present invention also provides content provider 12 and wireless carrier 14 with the ability to turn off services to individual users of mobile devices 18, or to all users simultaneously. Further, the present invention provides the ability of content provider 12 to rotate broadcast keys to enhance security.

External Security Component

Figure 11A:
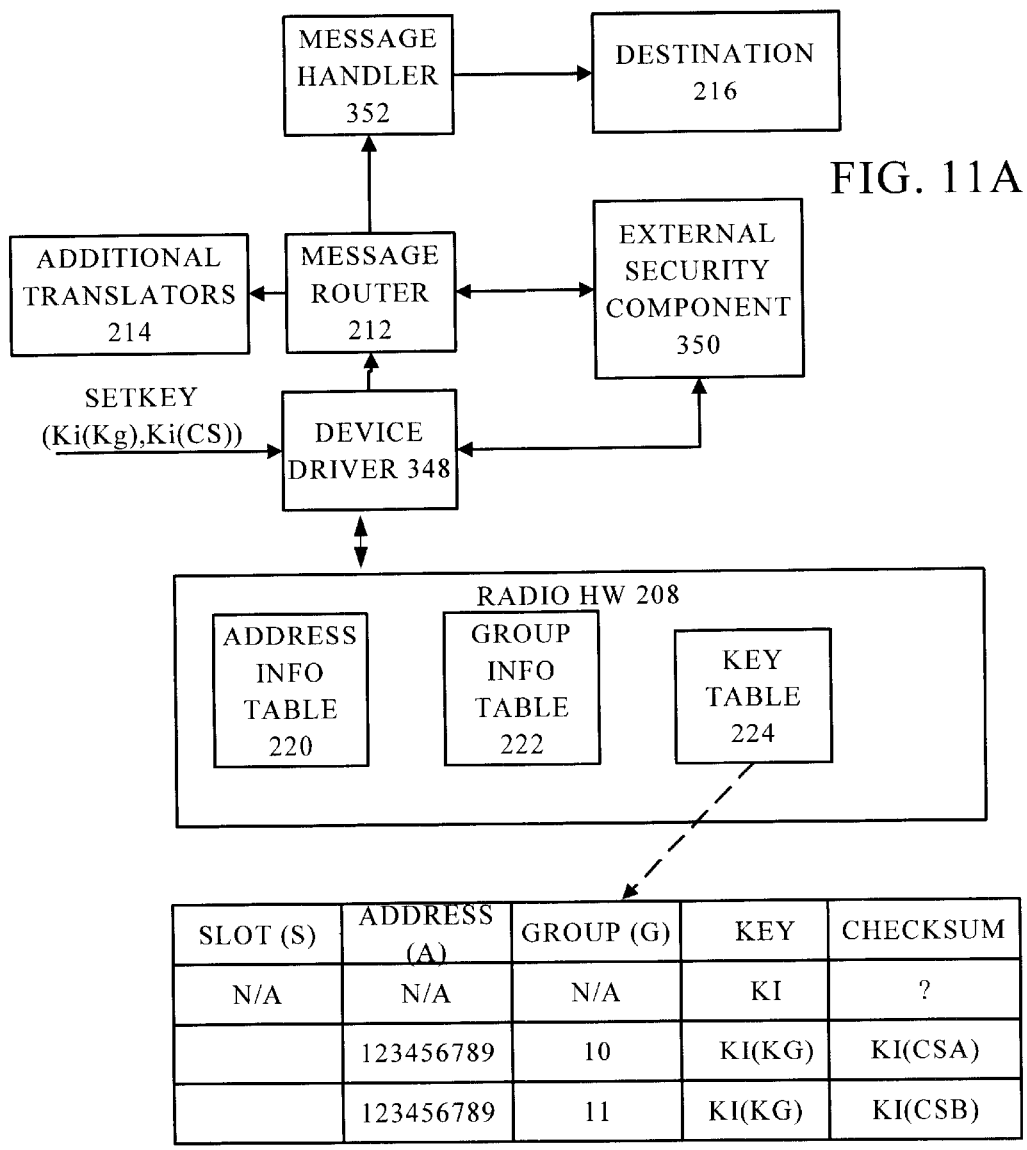
FIG. 11A illustrates a more detailed block diagram of a second embodiment of a mobile device in accordance with one aspect of the present invention.

FIG. 11A is a block diagram illustrating a second embodiment of mobile device 18 in accordance with another aspect of the present invention. Some items are similar to those illustrated in FIG. 6, and are similarly numbered. Some items have also simply been eliminated from FIG. 11A, for the purposes of clarity. However, the components in mobile device 18 shown in FIG. 11A, which are necessary for the understanding of this aspect of the present invention, are illustrated.

Figure 11B:
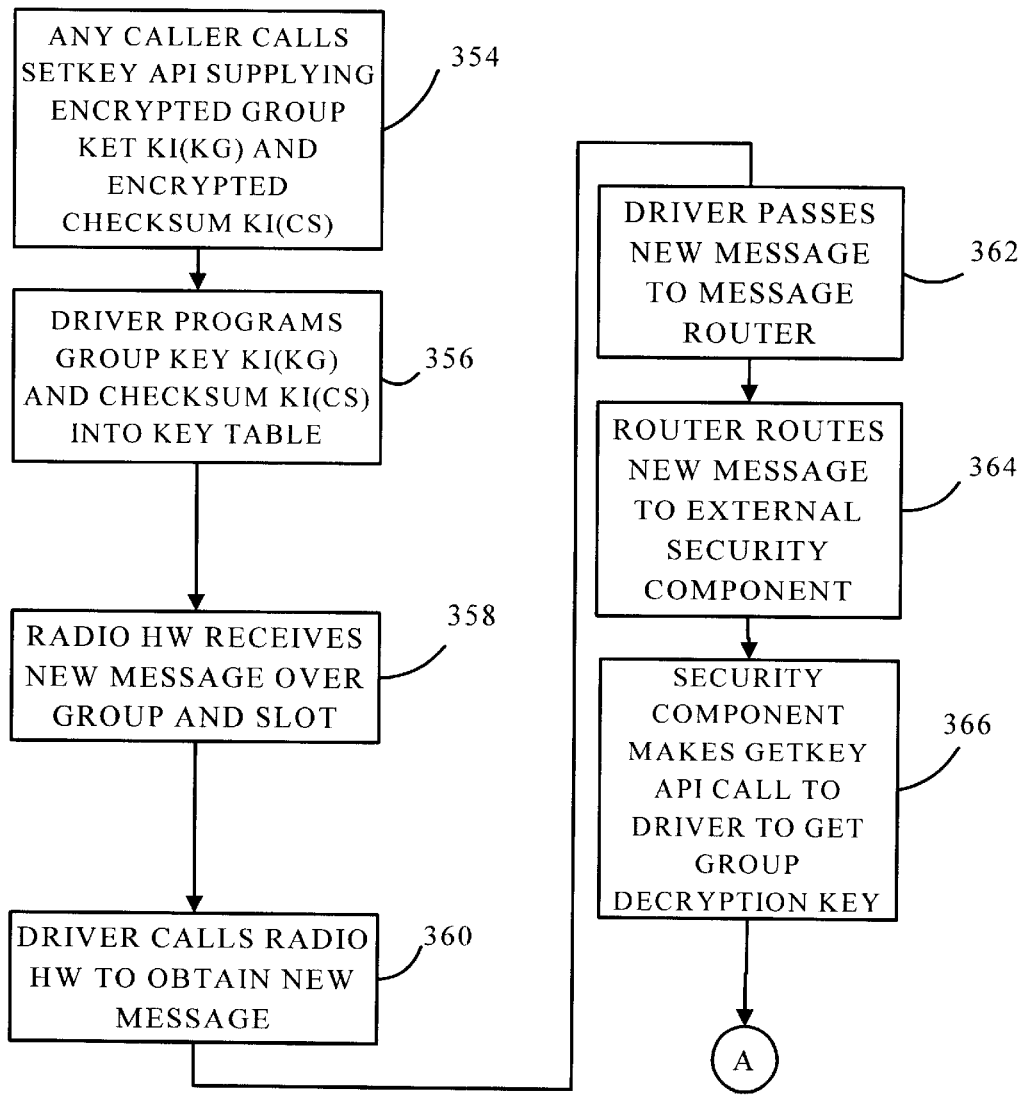
FIGS. 11B and 11C illustrate programming of a broadcast key into the mobile device illustrated in FIG. 11A, and decrypting an encrypted content message on the mobile device illustrated in FIG. 11A.
Figure 11C:
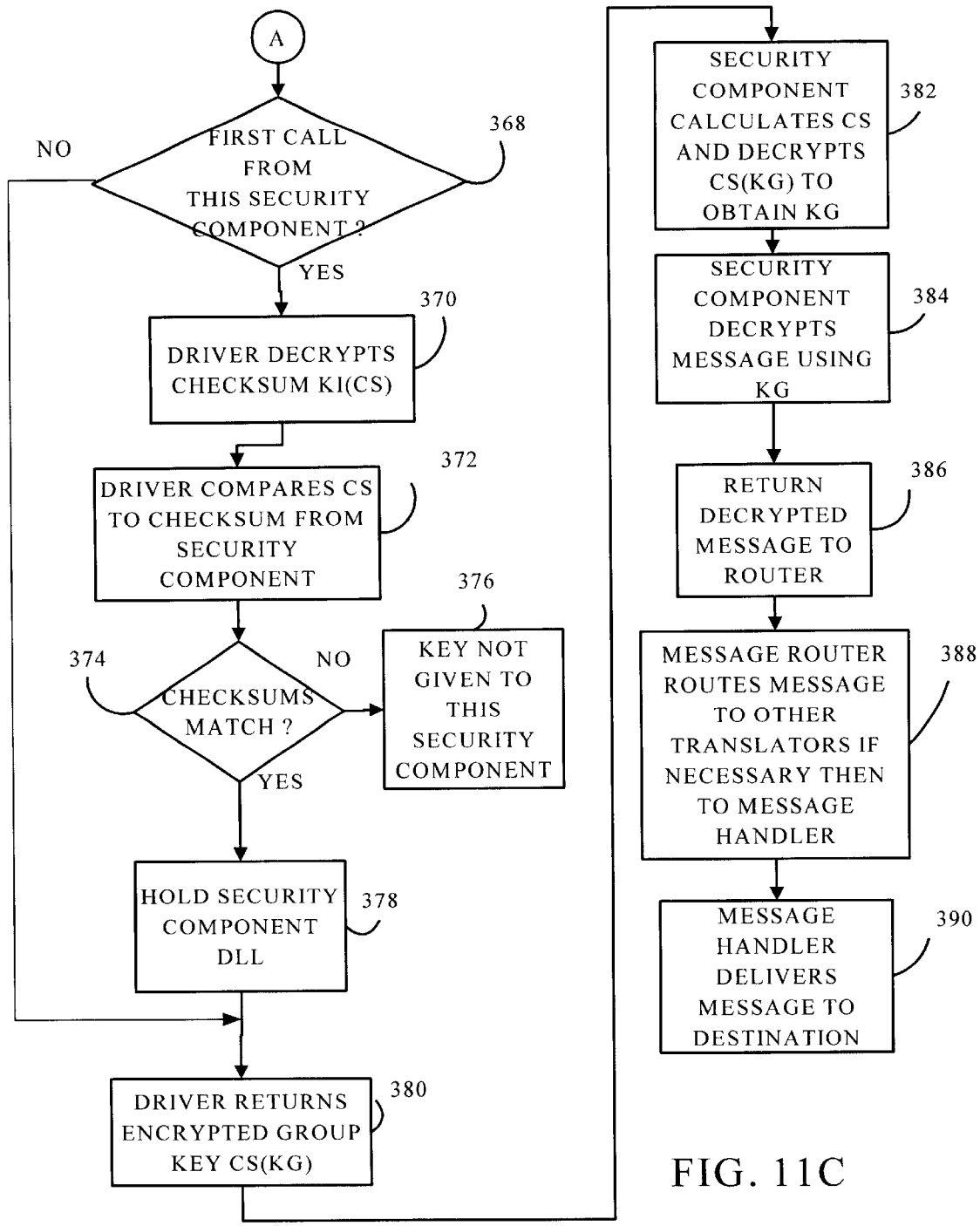

FIG. 11A illustrates that mobile device 18 includes radio HW 208, device driver 348, message router 212, optional additional translators 214, external security component 350, message handler 352 and destination 216. FIGS. 11B and 11C are flow diagrams illustrating the operation of mobile device 18 in obtaining new address or group code keys, decrypting those keys, and using the keys to decrypt incoming messages. FIGS. 11B and 11C are described in conjunction with FIG. 11A.

FIG. 11A illustrates one embodiment of key table 224 which includes slots, addresses, groups, associated keys and checksums. The key designated Ki is used to designate a unique encryption key which is unique to mobile device 18 and is derived from a secret value, secret to mobile device 18 and wireless carrier 14 (such as the EID). Group keys are designated Kg and Kh, and check sums are designated CS.

Ki is set by the card manufacturer and is permanently stored in the key table 224 in radio HW 208. The Kg and Kh keys can be programmed into key table 224 over-the-air, or over the web, or by any other suitable transmission link.

The term SetKey represents an exposed API from device driver 348 which allows an application to set encrypted keys in key table 224 of radio HW 208. The SetKey API operates on a given address and group number to set group keys and checksums in key table 224. The group keys are always provided to device driver 348 in encrypted form with Ki (using the notation Ki (kg) to represent key Kg encrypted using key Ki) so that a valid group key cannot be created without also knowing the confidential Ki (which is known only by the carrier and the manufacturer).

Checksums CS are also handed to device driver 348 in encrypted form, encrypted with Ki (i.e., Ki (CS)). In order to set a key into key table 224, any caller simply calls the SetKey API providing Ki (Kg) and Ki (CS). Device driver 348, in turn, makes an I/O control call to radio HW 208 to set the encrypted group key and checksum (Ki (Kg) and Ki (CS)) into key table 224. This is indicated by blocks 354 and 356 in FIG. 11B.

When a new encrypted content message arrives for a specific group on a specific slot, at radio HW 208, device driver 348 makes an I/O control call to radio HW 208 to retrieve the message from radio HW 208. This is indicated by blocks 358 and 360. Device driver 348, in turn, passes the message to message router 212. Message router 212 passes the encrypted message to external security component 350, which is external to device driver 348. This is determined by message router 212 based on the messages routing headers. This is indicated by blocks 362 and 364.

Security component 350 makes an API call (herein referred to as GetKey) to device driver 348 to obtain the key for the slot number and group number over which the message was received. This is indicated by block 366.

If this is the first time that device driver 348 has received an API call from that particular external security component 350, driver 348 verifies that it is the correct component which should be receiving the key information. The determination as to whether this is the first API call from the security component is indicated by block 368.

In order to verify that the security component is the correct component, device driver 348 decrypts Ki (CS) and compares the decrypted checksum with an actual checksum calculated on the DLL file of security component 250. This is indicated by blocks 370 and 372.

The checksum of security component 350 is preferably a known value based on a closely held algorithm. It should be noted that the checksum, like the group keys, are always provided to device driver 348 already encrypted by Ki. Thus, even if the checksum value is known, it is not possible for device driver 348 to use that checksum, since device driver 348 will only use it if it is encrypted with Ki. It should also be noted that a malicious user could attempt to modify the security component 350 to always use Kg, if the malicious user knows Kg. However, modifying the security component DLL would be detected by the checksum and would thus not succeed.

If the decrypted checksum does not match the checksum of the security component DLL, the key will not be provided to that security component 350. This is indicated by blocks 374 and 376.

However, if the checksums do match, then it is desirable to hold the DLL of the security component to prevent it from changing on subsequent calls. In other words, if device driver 348 knows that the checksum of the DLL in the security component 350 has not changed since a previous call, a new checksum need not be calculated for the DLL with each subsequent call. There are a number of ways in which device driver 348 can hold the DLL. For instance, once the DLL from the security component is loaded by device driver 348, device driver 348 can simply refrain from unloading the DLL. Thus, the DLL will be held open and cannot be modified. Therefore, the original checksum verification can be assumed to be valid without making the actual comparison for each encrypted message received.

Alternatively, device driver 348 can execute an open for write on the DLL and simply hold the DLL open. In this way, the system simply does not allow changes to the DLL as long as it is open. The DLL can then be trusted for later use. Holding the DLL open is indicated by block 378.

After the security component DLL has been held, device driver 348 can return the group key to security component 350. However, in one preferred embodiment, the group key is returned in encrypted form, encrypted with the checksum CS so that the key is still not readily accessible. Checksum CS is preferably used to encrypt the group key since the security component can calculate this based on its own DLL. Alternatively, the decrypted checksum CS can be placed into secure storage on radio HW 208. Returning the group key CS (Kg) is indicated by block 380.

Upon receiving the encrypted group key, security component 350 performs a checksum on its own DLL and uses this checksum to decrypt CS (Kg) in order to obtain the group key Kg. This is indicated by blocks 382 and 384.

Security component 350 then uses the decrypted group key Kg to decrypt the encrypted content message, and returns the decrypted message to router 212. Router 212 then optionally routes the message to other translators, if necessary, and then to message handler 352. Message handler 352 then delivers the decrypted message to its destination. This is indicated by blocks 386, 388 and 390.

Thus, it can be seen that this embodiment of the present invention uses an external security component 350 such that the security component need not be internal to device driver 348. However, device driver 348 encrypts all of the keys stored on radio HW 208 using the secret EID and it only passes the decryption key outside of its code, after decrypting the stored key itself. Even before passing the key outside of its code, the key is re-encrypted with a key specific to the known security component. The security component applies a key which it derives itself to the key passed into it by the device driver 348 in order to obtain the decrypted group key for decrypting the content. Further, device driver 348 performs a checksum on the security component 350 before passing the encrypted group key to the security component. The actual checksum calculated for the security component is compared against an encrypted checksum (encrypted using th EID) stored on the radio HW 208. Further, for performance optimization, the checksum need only be calculated on the security component the first time the security component calls device driver 348. Thereafter, driver 348 holds the security component DLL open so that it cannot be changed.

Although the present invention has been described with reference to preferred embodiments, workers skilled in the art will recognize that changes may be made in form and detail without departing from the spirit and scope of the invention.

What is claimed is:

1. A method of controlling access to broadcast messages received by a plurality of mobile devices, comprising:

providing selected mobile devices, of the plurality of mobile devices, with a broadcast encryption key (BEK) including a group code;

encrypting the broadcast messages utilizing the BEK prior to broadcasting the broadcast messages such that the selected mobile devices having the BEK are configurable to decrypt the encrypted broadcast messages;

wherein encrypting further comprises:

obtaining a message specific broadcast key (MSBK) based on the BEK and message specific data, specific to the broadcast message;

encrypting the broadcast message with the MSBK to obtain an encrypted broadcast message;

adding the message specific data, in unencrypted form, to the encrypted broadcast message;

adding a header to the encrypted broadcast message; and broadcasting the encrypted broadcast messages to the mobile device over an address and the group code associated with the BEK;

providing the selected mobile devices with the group code;receiving the encrypted broadcast message on the selected mobile devices; and decrypting the encrypted broadcast messages on the selected mobile devices utilizing the BEK.

2. The method of claim 1, wherein the selected mobile devices each include a radio receiver and a driver component and further comprising:

receiving the BEK and group code on the selected mobile devices; and maintaining, on the radio receiver in the selected mobile devices, a key data structure in which the BEK is associated with the group code.

3. The method of claim 2 wherein maintaining comprises:

maintaining the key data structure such that the BEK is associated with the address and the group code.

4. The method of claim 2 wherein the mobile device is configured to receive broadcast messages over a plurality of addresses and group codes and wherein maintaining comprises:

maintaining the key data structure in which a plurality of BEKs are associated with the plurality of addresses and group codes.

5. The method of claim 2 wherein the driver component includes a cryptography component, wherein the selected mobile devices each include a message router external to the driver component and wherein decrypting the encrypted broadcast message comprises:

passing the message specific data to the driver component from the message router;

passing key information from the key data structure on the radio receiver to the driver component; and deriving, on the driver component, the MSBK based on the message specific data and the key information.

6. The method of claim 5 wherein decrypting the encrypted broadcast message further comprises:

storing the derived MSBK on the driver in a store at a location identified by a handle; and returning to the message router the handle.

7. The method of claim 6 wherein decrypting the encrypted broadcast message further comprises:

passing the encrypted broadcast message and the handle from the message router to the cryptography component in the driver component;

retrieving, at the cryptography component, the derived MSBK from the store based on the handle;

decrypting the encrypted broadcast message in the cryptography component using the derived MSBK; and returning the decrypted broadcast message to the message router.

8. The method of claim 7 wherein the radio receiver maintains address information indicative of the addresses over which broadcast messages are receivable by the selected mobile devices and wherein receiving the broadcast message comprises:

filtering broadcast messages on the radio receiver based on the address information.

9. The method of claim 8 wherein the radio receiver maintains group code information indicative of group codes over which broadcast messages are receivable by the selected mobile device, and wherein receiving broadcast messages comprises:

determining whether the broadcast message includes a group code;

if so, passing the group code information from the radio receiver to the driver component; and filtering broadcast messages in the driver component based on the group code included in the broadcast message and based on the group code information passed from the radio receiver.

10. A method of controlling access to broadcast messages received by a plurality of mobile devices, wherein each of the mobile devices includes a radio receiver, a driver component coupled to the radio receiver, a security component external to the driver component and coupled to the driver component, and a message router coupled to the security component and the driver component, comprising:

providing selected mobile devices, of the plurality of mobile devices, with a broadcast encryption key (BEK);

encrypting the broadcast messages utilizing the BEK prior to broadcasting the broadcast messages such that the selected mobile devices having the BEK are configurable to decrypt the encrypted broadcast messages;

broadcasting the encrypted broadcast messages;

receiving the encrypted broadcast message on the selected mobile devices from a message transmitter over an address and a group code;

decrypting the encrypted broadcast messages on the selected mobile devices utilizing the BEK; and wherein providing the selected mobile devices with a BEK comprises providing the driver component with an encrypted BEK comprising the BEK, associated with the group code, in encrypted form, encrypted with a base key confidential to the mobile device and the message transmitter; and passing the encrypted BEK to the radio receiver for storage thereon.

11. The method of claim 10 wherein providing the selected mobile devices with a BEK comprises:
providing the driver component with an encrypted checksum comprising a checksum of the security component associated with the group code, in encrypted form, encrypted with the base key; and
passing the encrypted checksum to the radio receiver for storage thereon.

12. The method of claim 11 wherein decrypting the encrypted broadcast message comprises:
passing the encrypted message to the security component;
the security component requesting the BEK from the driver component;
verifying validity of the security component at the driver component; and
returning to the security component the BEK encrypted with the checksum.

13. The method of claim 12 wherein decrypting the encrypted broadcast message comprises:
calculating, on the security component, a checksum on the security component;
decrypting, at the security component, the BEK received from the driver component using the checksum calculated by the security component; and
decrypting the encrypted broadcast message using the BEK.

14. The method of claim 13 and further comprising:
passing the decrypted broadcast message back to the message router.

15. The method of claim 12 wherein verifying validity of the security component comprises:
determining whether the security component has previously requested the BEK;
if not, decrypting, on the driver component, the encrypted checksum to obtain a decrypted checksum;
calculating, on the driver component, a checksum of the security component to obtain a calculated checksum; and
comparing the decrypted checksum with the calculated checksum.

16. The method of claim 15 and further comprising:
if the decrypted checksum is the same as the calculated checksum, holding the security component to avoid the security component changing checksum values.

17. A method of controlling access to broadcast messages received by a plurality of mobile devices, comprising:
providing selected mobile devices, of the plurality of mobile devices, with a broadcast encryption key (BEK);
encrypting the broadcast messages utilizing the BEK prior to broadcasting the broadcast messages such that the selected mobile devices having the BEK are configurable to decrypt the encrypted broadcast messages; and
broadcasting the encrypted broadcast messages;
receiving the encrypted broadcast message on the selected mobile devices;
decrypting the encrypted broadcast messages on the selected mobile devices utilizing the BEK; and
intermittently changing the BEK on the selected mobile devices.

18. The method of claim 17 wherein intermittently changing the BEK comprises:
forming a programming key based on the BEK and message specific data;
encrypting a new BEK with the programming key to obtain an encrypted new BEK;
adding the message specific data to the encrypted new BEK to form a new BEK message; and
transmitting the new BEK message to the selected mobile devices.

19. The method of claim 18 wherein intermittently clanging the BEK further comprises:
receiving the new BEK message;
obtaining the programming key based on the message specific data and the BEK stored on the mobile device;
decrypting the encrypted new BEK using the programming key; and
storing the new BEK on the mobile device.

20. A system for controlling access to a broadcast message transmitted over an address and received by a plurality of mobile devices, comprising:
a message originator including an encryption component that includes a message specific key generator configured to generate a message specific key based on an encryption key and message specific data, specific to the broadcast message, and to encrypt the broadcast message with the message specific key; and a transmitter configured to transmit the message specific data along with the encrypted message and to transmit an encryption key to selected mobile devices of the plurality of mobile devices;
each of the selected mobile devices include:
a radio receiver including a key store storing the encryption key, the radio receiver being configured to receive the encrypted message;
a decryption component internal to the driver component, the description component including a message specific key generator configured to obtain the encryption key from the key store on the radio receiver and the message specific data and generate the message specific key
a driver component, including the driver component being configured to place the derived message specific key in a key store location on the driver component and generate a handle indicative of the key store location;
a router coupled to the driver and configured to receive the encrypted message and the key handle and wherein the decryption component further comprises a security component configured to receive the key handle from the router and the encrypted message and to obtain the message specific key from the key location on the driver based on the key handle and to decrypt the encrypted message with the message specific key to obtain an unencrypted message.

21. The system of claim 20 wherein the security component is configured to return the unencrypted message to the router.

22. A system for controlling access to a broadcast message transmitted over an address and received by a plurality of mobile devices, comprising:
a message originator including:
an encryption component that includes a message specific key generator configured to generate a message specific key based on an encryption key and message specific data, specific to the broadcast message, and
to encrypt the broadcast message with the message
specific key; and
a transmitter configured to transmit the message specific data along with the encrypted message and to transmit the encryption key to selected mobile devices of the plurality of mobile devices;
each of the selected mobile devices including:
a radio receiver including a key store storing the encryption key, the radio receiver being configured to receive the encrypted message;
a driver component, and a decryption component internal to the driver component, the decryption component including a message specific key generator configured to obtain the encryption key from the key store on the radio receiver and the message specific data and generate the message specific key; and
wherein the plurality of mobile devices are configured to receive broadcast messages over a group code transmittable to the radio receiver for storage thereon, the group code being associated with an address, the driver component being configured to decrypt broadcast messages received over the group code with the encryption key.

23. A system for controlling access to a broadcast message transmitted over an address and received by a plurality of mobile devices, comprising:
a message originator including:
an encryption component including a message specific key generator configured to generate a message specific key based on an encryption key and message specific data, specific to the broadcast message, and to encrypt the broadcast message with the message specific key; and
a transmitter configured to transmit the message specific data along with the encrypted message and to transmit the encryption key to selected mobile devices of the plurality of mobile devices;
each of the selected mobile devices including:
a radio receiver including a key store storing the encryption key, the radio receiver being configured to receive the encrypted message;
a driver component, and a decryption component internal to the driver component, the decryption component including a message specific key generator configured to obtain the encryption key from the key store on the radio receiver and the message specific data and generate the message specific key; and
wherein the plurality of mobile devices are configured to receive broadcast messages over a group code transmittable to the radio receiver for storage thereon, the group code being associated with an address and having an associated group key stored in the key store on the radio receiver, the driver component being configured to determine that the group code over which the broadcast message is received has an associated group key and to decrypt the broadcast message transmitted over the group code with the group code key.

24. The system of claim 23 wherein the transmitter is configured to transmit a programming message to program the group code and the group key into the radio receiver by encrypting the group code and group key based on a secret key confidential to one of the selected mobile devices and the transmitter.

25. The system of claim 24 wherein the originator is configured to change the group key without access to the secret key.

26. The system of claim 25 wherein the originator is configured to change the group key by performing the steps of:
forming a programming key based on a current group key and message specific data;
encrypting a new group key with the programming key to obtain an encrypted new group key;
adding the message specific data to the encrypted new group key to form a new group key message; and
passing the new group key message to the transmitter for transmission to the selected mobile devices.

27. The system of claim 26 wherein the driver component is configured to perform the steps of:
receiving the new group key message;
obtaining the programming key based on the message specific data and the current group key stored on the radio reviewer;
decrypting the encrypted new group key using the programming key; and
providing the new group key to the radio receiver for storage in the key store thereon.

28. A system for controlling access to a broadcast message transmitted over an address and a group code and received by a plurality of mobile devices, comprising:
a message originator including an encryption component configured to encrypt the broadcast message to form an encrypted message, and a transmission component configured to transmit the encrypted message and to transmit an encryption key to selected mobile devices of the plurality of mobile devices;
each of the selected mobile devices including a message receiver including a radio receiver component configured to receive the encrypted message, an encryption key store configured to receive the encryption key, a decryption component configured to decrypt the encrypted message;
a driver component coupled to the radio receiver;
a security component that is external to the driver component, and includes the decryption component, and is coupled to the driver component; and
a message router coupled to the security component and the driver component.

29. The system of claim 28 wherein the originator is configured to provide the selected mobile devices with the encryption key by performing the steps of:
providing the driver component with an encrypted group key comprising the encryption key, associated with the group code, in encrypted form, encrypted with a base key confidential to the mobile device and the message transmitter; and
passing the encrypted group key to the radio receiver for storage in the key store.

30. The system of claim 29 wherein the originator is configured to perform the steps of:
providing the driver component with an encrypted checksum comprising a checksum of the security component associated with the group code, in encrypted form, encrypted with the base key; and
passing the encrypted checksum to the radio receiver for storage thereon.

31. The system of claim 30 wherein the decryption component is configured to decrypt the encrypted broadcast message by performing the steps of:

passing the encrypted message to the security component;

the security component requesting the group key from the driver component;

verifying validity of the security component at the driver component; and returning to the security component the group key encrypted with the checksum.

32. The system of claim 31 wherein the security component is configured to decrypt the encrypted broadcast message by performing the steps of:

calculating a checksum on the security component;

providing the encrypted group key to the decrypting component;

decrypting the group key received from the driver component using the checksum calculated by the security component; and decrypting the encrypted broadcast message using the group key.

33. The system of claim 32 wherein verifying validity of the security component comprises:

determining whether the security component has previously requested the group key;

if not, decrypting, on the driver component, the encrypted checksum to obtain a decrypted checksum;

calculating, on the driver component, a checksum of the security component to obtain a calculated checksum; and comparing the decrypted checksum with the calculated checksum.

34. The system of claim 33 wherein the driver component is further configured to perform the step of:

if the decrypted checksum is the same as the calculated checksum, holding the security component to avoid the security component changing checksum values.

35. A method of controlling access to broadcast messages from subscription content providers received by a plurality of mobile devices, comprising:

providing selected mobile devices, of the plurality of mobile devices, with a broadcast encryption key (BEK);

encrypting the broadcast messages utilizing the BEK prior to broadcasting the broadcast messages such that the selected mobile devices having the BEK are configurable to decrypt the encrypted broadcast messages; and broadcasting the encrypted broadcast messages.

36. A system for controlling access to a broadcast message from a subscription content provider transmitted over an address and received by a plurality of mobile devices, comprising:

a message originator including an encryption component configured to encrypt the broadcast message to form an encrypted message, and a transmission component configured to transmit the encrypted message and to transmit an encryption key to selected mobile devices of the plurality of mobile devices; and each of the selected mobile devices including a message receiver including a receiver component configured to receive the encrypted message, an encryption key store configured to receive the encryption key, and a decryption component configured to decrypt the encrypted message.

* * * * *

UNITED STATES PATENT AND TRADEMARK OFFICE
CERTIFICATE OF CORRECTION

PATENT NO.   : 6,496,928 B1
DATED        : December 17, 2002
INVENTOR(S)  : Deo et al.

It is certified that error appears in the above-identified patent and that said Letters Patent is hereby corrected as shown below:

<u>Column 5,</u>
Line 37, "mobile" should be -- system --

<u>Column 6,</u>
Line 60, "memory 42" should be -- memory 32 --

<u>Column 10,</u>
Lines 5-8,

| Status (1) | Key Index (1) | Expir- ation Date (2) | Address Tag (8) | Address Info (n) | Address Name (32)* | Description (64)* |
|---|---|---|---|---|---|---|
| 0x01 | 0 | 401 | PERSONAL | | | |
| 0x01 | 1 | 0 | EXEC | | | |
| 0x01 | 0 | 534 | NEWS | | | |
| | | | | | | |
| 0x00 | 0 | 0 | (empty) | | | | should be --

| Status (1) | Key Index (1) | Expir- ation Date (2) | Address Tag (8) | Address Info (n) | Address Name (32)* | Description (64)* |
|---|---|---|---|---|---|---|
| 0x01 | 0 | 401 | PERSONAL | | | |
| 0x01 | 1 | 0 | EXEC | | | |
| 0x01 | 0 | 534 | NEWS | | | |
| | | | | | | |
| 0x00 | 0 | 0 | (empty) | | | |

--

Line 45, "PU" should be -- PO --

<u>Column 11,</u>
Line 50, "algorithtn" should be -- algorithm --
Line 66, "his" should be -- this --

UNITED STATES PATENT AND TRADEMARK OFFICE
CERTIFICATE OF CORRECTION

PATENT NO. : 6,496,928 B1
DATED : December 17, 2002
INVENTOR(S) : Deo et al.

It is certified that error appears in the above-identified patent and that said Letters Patent is hereby corrected as shown below:

Column 12,
Lines 16-45 (table): should be --

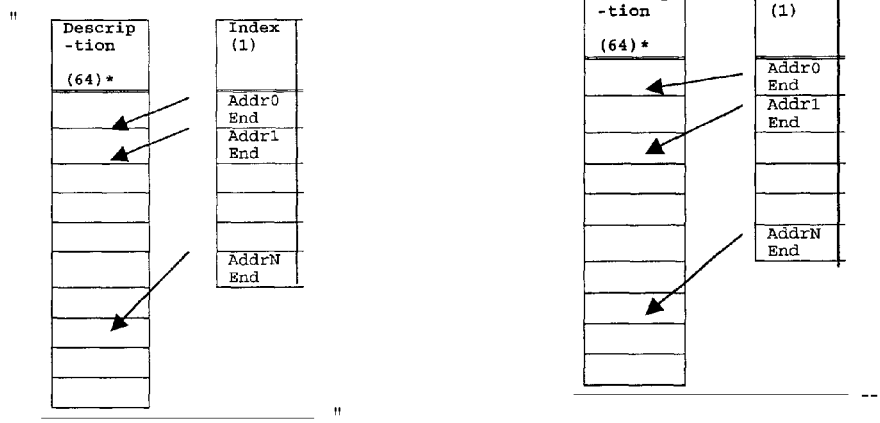

Column 13,
Line 15, "PU" should be -- PO --
Line 31, ""Local Weather" etc." should be -- ""Local Weather", etc. --

Column 14,
Line 60, before "using" insert -- ( --

Column 15,
Lines 15-23, should be --

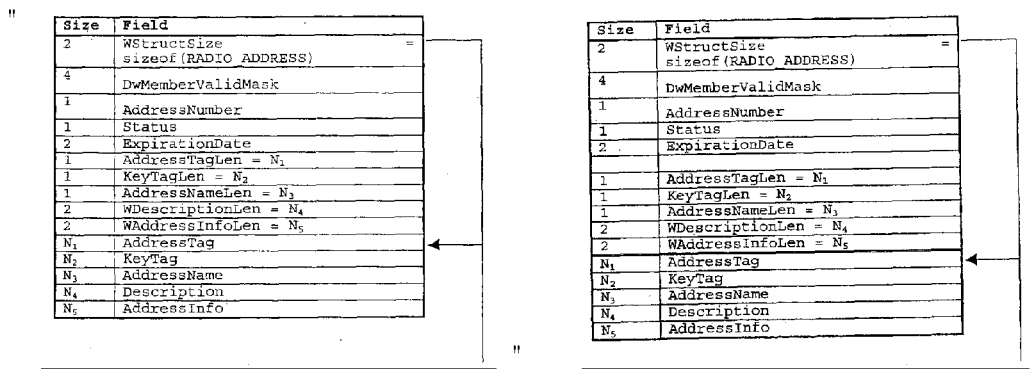

UNITED STATES PATENT AND TRADEMARK OFFICE
CERTIFICATE OF CORRECTION

PATENT NO. : 6,496,928 B1  
DATED : December 17, 2002  
INVENTOR(S) : Deo et al.

Page 3 of 4

It is certified that error appears in the above-identified patent and that said Letters Patent is hereby corrected as shown below:

Column 16,  
Line 12, "RADIO_DESC" should be -- RADIO_ADDRESS --  
Lines 39-41, should be

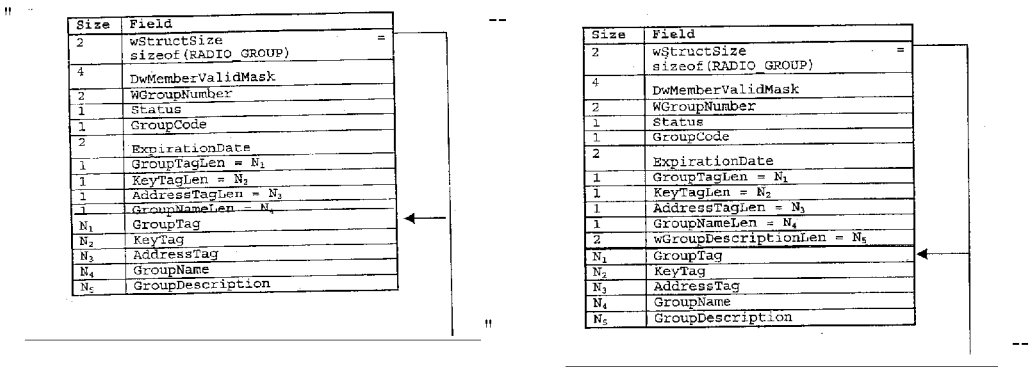

Column 17,  
Line 6, "Expiratio date." should be -- Expiration date.  
Line 10, "GroupTag" should be -- Address Tag --

Column 20,  
Line 40, insert -- HCRYPTKEY hKEY; --  
Line 55, "Electroinc" should be -- Electronic --

Column 21,  
Line 40, delete "."

Column 27,  
Line 32, there is no closing parenthesis

UNITED STATES PATENT AND TRADEMARK OFFICE
CERTIFICATE OF CORRECTION

PATENT NO.    : 6,496,928 B1
DATED         : December 17, 2002
INVENTOR(S)   : Deo et al.

It is certified that error appears in the above-identified patent and that said Letters Patent is hereby corrected as shown below:

Column 31,
Line 2, "th" should be -- the --

Column 36,
Line 17, "reviewer" should be -- receiver --

Signed and Sealed this

Tenth Day of August, 2004

JON W. DUDAS
*Acting Director of the United States Patent and Trademark Office*